United States Patent
Kawauchi et al.

(10) Patent No.: US 7,986,615 B2
(45) Date of Patent: Jul. 26, 2011

(54) DEMODULATING CIRCUIT, DEMODULATING METHOD, PROGRAM, AND RECEIVING DEVICE

(75) Inventors: Hidetoshi Kawauchi, Kanagawa (JP); Toshiyuki Miyauchi, Kanagawa (JP); Takashi Yokokawa, Kanagawa (JP); Takashi Horiguti, Kanagawa (JP); Naoki Yoshimochi, Tokyo (JP); Yasuhiro Iida, Tokyo (JP); Satoru Hori, Kanagawa (JP)

(73) Assignee: Sony Corporation, Tokyo (JP)

( * ) Notice: Subject to any disclaimer, the term of this patent is extended or adjusted under 35 U.S.C. 154(b) by 174 days.

(21) Appl. No.: 12/403,436

(22) Filed: Mar. 13, 2009

(65) Prior Publication Data
US 2009/0231994 A1 Sep. 17, 2009

(30) Foreign Application Priority Data

Mar. 14, 2008 (JP) ................ P2008-065545

(51) Int. Cl.
*H04J 11/00* (2006.01)

(52) U.S. Cl. ........................... 370/210; 370/208

(58) Field of Classification Search .......... 370/203–211; 375/235, 260, 261; 708/403–405
See application file for complete search history.

(56) References Cited

U.S. PATENT DOCUMENTS 7,436,759 B2 * 10/2008 Hayashi et al. ............... 370/208

| | | | |
|---|---|---|---|
| 2002/0181549 A1 | 12/2002 | Linnartz et al. | |
| 2003/0227866 A1 * | 12/2003 | Yamaguchi | 370/208 |
| 2007/0036231 A1 * | 2/2007 | Ido | 375/260 |
| 2007/0036232 A1 * | 2/2007 | Hayashi | 375/260 |
| 2010/0166050 A1 * | 7/2010 | Aue | 375/224 |

FOREIGN PATENT DOCUMENTS

| | | |
|---|---|---|
| JP | 2003 218826 | 7/2003 |
| JP | 2003 524338 | 8/2003 |

OTHER PUBLICATIONS

Satoshi Suyama et al., "A Scattered Pilot OFDM Equalizer for Multipath Environments with the Delay Difference Greater than Guard Interval", Mobile Communications, Scattered pilot, OFDM, Guard Interval, Inter-Symbol Interference, Inter-Carrier Interference, Adaptive Equalizer, The Institute of Electronics, Information and Communication Engineers, Jul. 10, 2002, RCS2002-103, vol. 102, No. 201, pp. 79-84.

* cited by examiner

*Primary Examiner* — Ricky Ngo
*Assistant Examiner* — Gary Mui
(74) *Attorney, Agent, or Firm* — Frommer Lawrence & Haug LLP; William S. Frommer

(57) ABSTRACT

A demodulating circuit including: an FFT processing section; an intercarrier interferential component removing section; an extracting section; a transmission path characteristics estimating section; an interpolating section; a symbol sequence estimating section; and an interference replica generating section.

8 Claims, 18 Drawing Sheets

Related Art

DEMODULATING CIRCUIT, DEMODULATING METHOD, PROGRAM, AND RECEIVING DEVICE

BACKGROUND OF THE INVENTION

1. Field of the Invention

The present invention relates to a demodulating circuit, a demodulating method, a program, and a receiving device, and more particularly to a demodulating circuit, a demodulating method, a program, and a receiving device for efficiently removing interferential components.

2. Description of the Related Art

Orthogonal Frequency Division Multiplexing (OFDM) scheme has been used as a modulation scheme for terrestrial digital broadcasts. According to the OFDM scheme, a number of orthogonal subcarriers are used in the transmission band, and data are assigned to the amplitudes and phases of the subcarriers and digitally modulated by PSK (Phase Shift Keying) or QAM (Quadrature Amplitude Modulation).

According to the OFDM scheme, since the overall transmission band is divided by the many subcarriers, the band per each subcarrier is narrow and the transmission rate thereof is low. However, the total transmission rate remains the same as with the conventional modulation scheme.

The OFDM scheme is also characterized in that the symbol rate is low because the many subcarriers are transmitted parallel to each other. Consequently, the multipath time length against the time length of one symbol is relatively short, making the transmitted data less susceptible to multipath.

Furthermore, as the data are assigned to the plural subcarriers, the transmitting circuit may include an IFFT (Inverse Fast Fourier Transform) arithmetic circuit for performing inverse Fourier transform for data modulation, and the receiving circuit may include an FFT (Fast Fourier Transform) arithmetic circuit for performing Fourier transform for data demodulation.

For the reasons described above, the OFDM scheme is often applied to terrestrial digital broadcasts which are strongly adversely affected by multipath interference. The standards for terrestrial digital broadcasts based on the OFDM scheme include DVB-T (Digital Video Broadcasting-Terrestrial), ISDB-T (Integrated Services Digital Broadcasting-Terrestrial), and ISDB-TSB (Integrated Services Digital Broadcasting-Terrestrial for Sound Broadcasting).

FIG. 1 of the accompanying drawings is a diagram showing OFDM symbols.

According to the OFDM scheme, a signal is transmitted in units referred to as OFDM symbols (hereinafter also referred to as "symbols").

As shown in FIG. 1, one symbol includes an effective symbol representing a signal zone in which IFFT is performed upon transmission and a guard interval (hereinafter referred to as "GI") to which the waveform of a portion of the latter half of the effective symbol is copied. The GI is inserted into a position prior to the effective symbol on the time axis. The inserted GI makes it possible to increase multipath resistance.

A plurality of symbols described above are combined into one OFDM transmission frame. According to the ISDB-T standards, for example, 204 symbols make up one OFDM transmission frame. The positions where pilot signals are inserted are determined with respect to the unit of OFDM transmission frames.

According to the OFDM scheme which employs a QAM process for modulating each subcarrier, since transmitted data are adversely affected by multipath, the amplitude and phase of each subcarrier of the received signal are different from the amplitude and phase of each subcarrier of the transmitted signal. Therefore, the reception side needs to equalize the received signal such that the amplitude and phase thereof are equal to the amplitude and phase of the transmitted signal.

According to the OFDM scheme, the transmission side discretely inserts pilot signals having a given amplitude and phase, and the reception side determines the frequency characteristics of the transmission path based on the amplitude and phase of the pilot signals. The received signal is equalized based on the determined frequency characteristics.

Pilot signals used for calculating the transmission path characteristics are referred to as scattered pilot signals (SP signals). FIG. 2 of the accompanying drawings shows a layout pattern of SP signals that are employed by the DVB-T standards and the ISDB-T standards.

FIG. 3 of the accompanying drawings shows a configurational example of an OFDM receiver according to the related art.

A broadcast wave received by an antenna, not shown, is converted by a tuner into an IF signal, which is converted by an A/D (Analog/Digital) converter into a digital signal. The digital signal is quadrature-demodulated by a quadrature demodulator into a baseband OFDM signal, which is input to a GI remover 1 shown in FIG. 3.

The baseband OFDM signal that is input to the GI remover 1 is a so-called time-domain signal to be processed for FFT. The time-domain signal to be processed for FFT is referred to as an OFDM time-domain signal. When the OFDM time-domain signal is quadrature-demodulated, it becomes a complex signal including a real-axis signal (I-channel signal) and a virtual-axis signal (Q-channel signal).

The GI remover 1 removes a GI added by the transmission side from each symbol transmitted by the OFDM time-domain signal, according to a timing signal supplied from a symbol synchronizer 11. By removing the GI, the GI remover 1 produces an OFDM time-domain signal representative of effective symbols, and outputs the produced OFDM time-domain signal to an FFT processor 2.

The FFT processor 2 performs an FFT process on the OFDM time-domain signal supplied from the GI remover 1, thereby extracting data with which each subcarrier has been quadrature-modulated. The FFT processor 2 starts the FFT process somewhere between a position A shown in FIG. 1 which serves as the boundary between adjacent symbols and a position B which serves as the boundary between the GI and the effective symbol. For example, the starting position of an FFT zone which is to be subjected to the FFT process is indicated by a timing signal supplied from the symbol synchronizer 11.

The FFT processor 2 outputs an OFDM signal representative of the extracted data. This OFDM signal is a frequency-domain signal produced after the FFT process is performed. The OFDM signal produced after the FFT process is performed is referred to as an OFDM frequency-domain signal. The OFDM frequency-domain signal output from the FFT processor 2 is supplied to an SP extractor 3 and a complex divider 8. Since the OFDM frequency-domain signal output from the FFT processor 2 is a signal distorted by the transmission path, it needs to be compensated for the distortion. The frequency characteristics of the transmission path which are used to compensate for the distortion caused by the transmission path are estimated by the configuration of circuits ranging from the SP extractor 3 to an interpolator 7.

The SP extractor 3 extracts SP signals inserted in respective positions identified by subcarrier numbers and symbol numbers as shown in FIG. 2, from the OFDM frequency-domain signal. In FIG. 2, the vertical axis represents a symbol direction (time direction) and the horizontal axis represents a subcarrier direction (frequency direction). The SP extractor 3 outputs the extracted SP signals to a complex divider 4.

The complex divider 4 divides the SP signals supplied from the SP extractor 3 by SP signals reproduced by a transmission SP reproducer 5 to thereby calculate transmission path characteristics at the positions where the SP signals are inserted. The complex divider 4 outputs a signal representative of the calculated transmission path characteristics to a time direction transmission path characteristics estimator 6.

The transmission SP reproducer 5 reproduces SP signals and outputs the reproduced SP signals to the complex divider 4.

The time direction transmission path characteristics estimator 6 estimates transmission path characteristics, at the positions of the respective symbols that are arranged in the time direction, of the subcarriers with the SP signals inserted therein, based on the transmission path characteristics at the positions where the SP signals are inserted, which are represented by the signal supplied from the complex divider 4. Since an SP signal is inserted for every 12 subcarriers at one time as shown in FIG. 2, the time direction transmission path characteristics estimator 6 estimates transmission path characteristics at the position of each symbol for every 3 subcarriers. The time direction transmission path characteristics estimator 6 outputs a signal representative of the estimated values of the transmission path characteristics for every 3 subcarriers to the interpolator 7.

The interpolator 7 interpolates, in the frequency direction, the estimated values of the transmission path characteristics which are represented by the signal supplied from the time direction transmission path characteristics estimator 6, thereby estimating transmission path characteristics for subcarriers where no SP signals are inserted. In this manner, the transmission path characteristics for all the subcarriers are determined. The interpolator 7 outputs a signal representative of the estimated values of the transmission path characteristics for all the subcarriers. The signal output from the interpolator 7 is supplied to the complex divider 8 and an IFFT processor 10.

The complex divider 8 divides the OFDM frequency-domain signal supplied from the FFT processor 2 by the signal supplied from the interpolator 7, thereby compensating for the transmission path distortion included in the OFDM frequency-domain signal. The complex divider 8 outputs an equalized signal produced by compensating for the transmission path distortion to an error corrector 9.

The error corrector 9 deinterleaves the signal which has been interleaved at the transmission side, and also processes the signal according to depuncture, Viterbi decoding, spread signal removal, RS decoding and the like. The error corrector 9 outputs the processed data as decoded data to a circuit at a subsequent stage.

The IFFT processor 10 performs an IFFT process on the signal representative of the transmission path characteristics estimated from the OFDM frequency-domain signal by the SP extractor 3, the complex divider 4, the time direction transmission path characteristics estimator 6, and the interpolator 7, thus determining an impulse response of the transmission path. The IFFT processor 10 then outputs a signal representative of the determined impulse response to the symbol synchronizer 11.

The symbol synchronizer 11 detects the boundary between symbols from the impulse response of the transmission path which is represented by the signal supplied from the IFFT processor 10. The symbol synchronizer 11 generates a timing signal indicating the detected boundary position as a GI starting position and also indicating a position which is subsequently spaced from the detected boundary position by the GI length as an FFT zone starting position, and outputs the generated timing signal to the GI remover 1 and the FFT processor 2.

The time direction transmission path characteristics estimator 6 can employ various methods, e.g., an interpolative method, a predictive method, etc. for estimating transmission path characteristics in the time direction.

FIG. 4 of the accompanying drawings is a diagram showing by way of example an interpolative method for estimating transmission path characteristics in the time direction.

In FIG. 4, each symbol is indicated as $S_{i,h}$ depending on its position where i represents a symbol number and h a carrier number. For example, symbol $S_{12,0}$ means symbol S shown in FIG. 4 which is inserted in a position that is identified by symbol number 12 and carrier number 0.

Attention is drawn to symbol number 12 enclosed by the dotted lines in FIG. 4. Complex divider 4 estimates transmission path characteristics at the respective positions of symbols $S_{12,0}$, $S_{12,12}$, $S_{12,24}$ from the SP signals extracted by the SP extractor 3 and the SP signals reproduced by the transmission SP reproducer 5. The time direction transmission path characteristics estimator 6 estimates, by way of linear interpolation, transmission path characteristics for every 3 subcarriers, i.e., subcarriers indicated by subcarrier numbers 3, 6, 9, ..., based on the estimated values of the transmission path characteristics at the respective positions of symbols $S_{12,0}$, $S_{12,12}$, $S_{12,24}$. The subcarriers indicated by subcarrier numbers 3, 6, 9, ... are subcarriers where SP signals are inserted for every 4 symbols as viewed in the time direction.

For example, the transmission path characteristics at the position of symbol $S_{12,3}$ are estimated based on the transmission path characteristics at the position of symbol $S_{9,3}$ estimated from the SP signal that is received 3 symbols earlier and the transmission path characteristics at the position of symbol $S_{13,3}$ estimated from the SP signal that is received 1 symbol later.

The transmission path characteristics at the position of symbol $S_{12,6}$ are estimated based on the transmission path characteristics at the position of symbol $S_{10,6}$ estimated from the SP signal that is received 2 symbols earlier and the transmission path characteristics at the position of symbol $S_{14,6}$ estimated from the SP signal that is received 2 symbols later.

The transmission path characteristics at the position of symbol $S_{12,9}$ are estimated based on the transmission path characteristics at the position of symbol $S_{11,9}$ estimated from the SP signal that is received 1 symbol earlier and the transmission path characteristics at the position of symbol $S_{15,9}$ estimated from the SP signal that is received 3 symbols later.

As described above, the interpolative estimating method is a method for estimating transmission path characteristics at a position between already received SP signals based on the transmission path characteristics estimated from the already received SP signals.

According to the linear interpolation, therefore, the estimated values calculated by the time direction transmission path characteristics estimator 6 has a delay equivalent to 3 symbols from the received symbols. Though not shown in FIG. 3, a memory is required between the FFT processor 2 and the complex divider 8 for delaying the OFDM frequency-domain signal to be input to the complex divider 8 by 3 symbols.

In the example shown in FIG. 4, the present received symbols, i.e., the symbols represented by the OFDM frequency-domain signal output from the FFT processor 2, are indicated by symbol number 15. The transmission path characteristics that can be calculated at the present timing which have a timing closer to the present timing are transmission path characteristics at the position of symbol number 12. Therefore, for compensating for the transmission path distortion, it is necessary to delay the OFDM frequency-domain signal from the FFT processor 2 by 3 symbols.

FIG. 5 of the accompanying drawings is a diagram showing by way of example a predictive method for estimating transmission path characteristics in the time direction.

The predictive estimating method is a method for estimating transmission path characteristics at a subsequent position using already received SP signals.

If the present received symbols are indicated by symbol number 15 as shown in FIG. 5, then transmission path characteristics at the position of symbols indicated by symbol number 16, which are received later by 1 symbol, are estimated.

For example, the transmission path characteristics at the position of symbol $S_{16,0}$ are estimated based on the transmission path characteristics at either one of the positions of symbols $S_{12,0}$, $S_{8,0}$, $S_{4,0}$, ... which are estimated by the already received SP signals.

The transmission path characteristics at the position of symbol $S_{16,3}$ are estimated based on the transmission path characteristics at either one of the positions of symbols $S_{13,3}$, $S_{9,3}$, $S_{5,3}$, ... which are estimated by the already received SP signals.

The transmission path characteristics at the position of symbol $S_{16,6}$ are estimated based on the transmission path characteristics at either one of the positions of symbols $S_{14,6}$, $S_{10,6}$, $S_{6,6}$, ... which are estimated by the already received SP signals.

If the above predictive estimating method is used as the method for estimating transmission path characteristics in the time direction, then in order for the complex divider 8 to compensate for the transmission path distortion, it is necessary to delay the estimated values of the transmission path characteristics which is supplied to the complex divider 8 by 1 symbol.

FIG. 6 of the accompanying drawings is a block diagram of a configurational example of the time direction transmission path characteristics estimator 6 which estimates transmission path characteristics in the time direction according to the predictive estimating method.

The configurational example shown in FIG. 6 is arranged to process the signal of one subcarrier with SP signals inserted therein. It is assumed that the configurational example shown in FIG. 6 processes the signal of a subcarrier indicated by subcarrier number 0.

As shown in FIG. 6, the time direction transmission path characteristics estimator 6 includes a variable-coefficient FIR filter 21, a coefficient updater 22, a subtractor 23, a delay circuit 24, and an interpolator 25. The signal output from the complex divider 4, which is representative of the estimated values of the transmission path characteristics determined from SP signals inserted for every 4 symbols as viewed in the time direction, is input to the variable-coefficient FIR filter 21 and the subtractor 23. For example, signals representative of the estimated values of the transmission path characteristics at the respective positions of symbols $S_{0,0}$, $S_{4,0}$, $S_{8,0}$, $S_{12,0}$ shown in FIG. 5 are successively input to the variable-coefficient FIR filter 21 and the subtractor 23.

The variable-coefficient FIR filter 21 filters the input signal using coefficients updated by the coefficient updater 22. The variable-coefficient FIR filter 21 estimates, from the estimated values of the transmission path characteristics determined from an already received SP signal, transmission path characteristics at a position where an SP signal received next to the already received SP signal is inserted. For example, if a signal representative of the estimated values of the transmission path characteristics at the position of symbol $S_{12,0}$ shown in FIG. 5 is input, then transmission path characteristics at the position of symbol $S_{16,0}$ are estimated by the filtering of the variable-coefficient FIR filter 21.

The variable-coefficient FIR filter 21 outputs a signal representative of the estimated values of the transmission path characteristics. The signal output from the variable-coefficient FIR filter 21 is supplied to the subtractor 23, the delay circuit 24, and the interpolator 25.

The coefficient updater 22 updates the tap coefficients of the variable-coefficient FIR filter 21 based on a signal supplied from the subtractor 23. The tap coefficients of the variable-coefficient FIR filter 21 are updated depending on the difference between the transmission path characteristics determined from an SP signal that is actually received at a certain timing and the estimated values of the transmission path characteristics. The tap coefficients may be updated according to a known algorithm such as an LMS (Least Mean Square) algorithm.

The subtractor 23 calculates the difference between the signal supplied from the complex divider 4 and the signal supplied from the variable-coefficient FIR filter 21, and outputs a signal representative of the calculated difference to the coefficient updater 22.

The delay circuit 24 delays the signal supplied from the variable-coefficient FIR filter 21 by 4 symbols, and outputs the delayed signal to the interpolator 25. The interpolator 25 is supplied with a signal representative of the estimated values of the transmission path characteristics at a position where an SP signal received at a certain time is inserted and a signal representative of the estimated values of the transmission path characteristics at a position where an SP signal received next to the SP signal is inserted.

The interpolator 25 estimates, by way of interpolation, transmission path characteristics at respective times between two SP signals received at earlier and later times, based on estimated values of the transmission path characteristics at the positions where the SP signals are inserted.

FIG. 7 of the accompanying drawings is a diagram showing the manner in which transmission path characteristics are estimated.

The horizontal axis of FIG. 7 represents time. Different positions along the vertical axis of SP signals that are received respectively at times $t_0$, $t_1$, $t_2$, ... indicate that the SP signals have suffered transmission path characteristics variations.

It is assumed that the present time is indicated by time $t_3$ and transmission path characteristics at the position where an SP signal received at time $t_7$ is inserted are estimated from transmission path characteristics at the position where an SP signal received at time $t_3$ is inserted. Signals representative of these two transmission path characteristics are input to interpolator 25. Interpolator 25 estimates, by way of linear interpolation, for example, transmission path characteristics at respective times $t_4$, $t_5$, $t_6$ based on the transmission path characteristics at the position where the SP signal received at time $t_3$ is inserted and the transmission path characteristics at the position where the SP signal received at time $t_7$ is inserted.

If the SP signal received at time $t_3$ is an SP signal inserted at the position of symbol $S_{12,0}$, then the SP signal at time $t_7$ for which transmission path characteristics are to be estimated is an SP signal inserted at the position of symbol $S_{16,0}$. Transmission path characteristics at respective times $t_4$, $t_5$, $t_6$ which are estimated by way of linear interpolation are transmission path characteristics at the respective positions of symbols $S_{13,0}$, $S_{14,0}$, $S_{15,0}$.

The OFDM scheme is capable of performing a demodulating process without causing an interference between symbols and an interference with a symbol by another carrier, in a multipath environment wherein a delay spread is smaller than the GI and the transmission path characteristics are free from time-dependent variations. The OFDM scheme is also capable of performing a demodulating process without causing an interference between symbols and an interference with a symbol by another carrier, in an environment wherein the transmission path characteristics suffer such small variations that no time-dependent variations can be assumed in the FFT zone. The interference between symbols will be referred to as ISI (InterSymbol Interference) and the interference with a symbol by another carrier as ICI (InterCarrier Interference).

However, in an environment wherein a long-delay multipath occurs, such as an SFN (Single Frequency Network), a multipath wherein a delay spread is greater than the GI may be generated. In such an environment, ISIs and ICIs are caused to greatly degrade the reception performance.

Furthermore, transmission path characteristics are inevitably caused to vary in a mobile reception environment in which receivers themselves move around. In the mobile reception environment, the orthogonality of carriers is lost, tending to cause ICIs.

Japanese Patent Laid-Open No. 2003-218826 (hereinafter referred to as Patent Document 1) discloses a technology for preventing the reception performance from being degraded in such an environment.

According to the disclosed technology, an OFDM time-domain signal is multiplied by a window function and then processed for FFT, an interferential component is removed from the FFT-processed signal using a replica representative of the interferential component, and a transmission symbol sequence is estimated from the signal from which the interferential component has been removed by a maximum likelihood sequence estimation process. The interferential component is calculated from the estimated values of the transmission symbol sequence and the estimated values of the impulse response of the transmission path. The estimated values of the impulse response used to calculate the interferential component is calculated by an FIR filter which handles a signal for a delay spread smaller than the GI and a signal for a delay spread greater than the GI. The FIR filter includes delay lines for processing the respective signals, a memory and the like.

SUMMARY OF THE INVENTION

As disclosed in Patent Document 1, if an impulse response is estimated using delay lines for an expected delay, the overall circuit needs to be large in scale because it requires a memory for delaying the signal by the expected delay and an FIR filter having as many multipliers as the number of taps depending on the expected delay.

It is desired for the present invention to provide a demodulating circuit, a demodulating method, a program, and a receiving device for efficiently removing an interferential component from a demodulated signal.

According to an embodiment of the present invention, a demodulating circuit includes FFT processing means for performing an FFT process on an OFDM time-domain signal, intercarrier interferential component removing means for removing an intercarrier interferential component from an OFDM frequency-domain signal which is produced when the FFT process is performed on the OFDM time-domain signal by the FFT processing means, extracting means for extracting pilot signals representative of transmission path characteristics of a transmission path from the OFDM frequency-domain signal from which the intercarrier interferential component is removed by the intercarrier interferential component removing means, transmission path characteristics estimating means for estimating transmission path characteristics represented by pilot signals which are received later, based on the transmission path characteristics represented by the pilot signals extracted by the extracting means, interpolating means for interpolating transmission path characteristics in a frequency direction based on the transmission path characteristics estimated by the transmission path characteristics estimating means thereby to estimate transmission path characteristics for all subcarriers, symbol sequence estimating means for estimating a symbol sequence represented by the OFDM frequency-domain signal which is produced when the FFT process is performed on the OFDM time-domain signal by the FFT processing means, based on the transmission path characteristics for all subcarriers which are estimated by the interpolating means, and interference replica generating means for generating an interference replica representing the intercarrier interferential component to be removed from the OFDM frequency-domain signal by the intercarrier interferential component removing means, based on the symbol sequence estimated by the symbol sequence estimating means and the transmission path characteristics for all subcarriers which are estimated by the interpolating means.

The demodulating circuit may further include multiplying means for multiplying the OFDM time-domain signal on which the FFT process is to be performed by the FFT processing means by a window function, processing means for determining an impulse response of the transmission path using all or part of the transmission path characteristics estimated for all the subcarriers after the FFT process, and window function determining means for moving the window function to be used by the multiplying means in at least either one of a phase direction and a DC direction depending on a delay spread which is estimated from the impulse response of the transmission path which is determined by the processing means.

The demodulating circuit may further include decimating means for decimating ones of the pilot signals extracted by the extracting means. The transmission path characteristics estimating means may estimate the transmission path characteristics represented by the pilot signals which are received later, based on transmission path characteristics represented by ones, not decimated by the decimating means, of the pilot signals extracted by the extracting means.

According to another embodiment of the present invention, a demodulating method or a program includes the steps of performing an FFT process on an OFDM time-domain signal, removing an intercarrier interferential component from an OFDM frequency-domain signal which is produced when the FFT process is performed on the OFDM time-domain signal, extracting pilot signals representative of transmission path characteristics of a transmission path from the OFDM frequency-domain signal from which the intercarrier interferential component is removed, estimating transmission path characteristics represented by pilot signals which are received later, based on the transmission path characteristics represented by the extracted pilot signals, interpolating transmission path characteristics in a frequency direction based on the estimated transmission path characteristics thereby to estimate transmission path characteristics for all subcarriers, estimating a symbol sequence represented by the OFDM frequency-domain signal which is produced when the FFT process is performed on the OFDM time-domain signal, based on the estimated transmission path characteristics for all subcarriers, and generating an interference replica representing the intercarrier interferential component to be removed from the OFDM frequency-domain signal, based on the estimated symbol sequence and the estimated transmission path characteristics for all subcarriers.

According to still another embodiment of the present invention, a receiving device includes FFT processing means for performing an FFT process on an OFDM time-domain signal, intercarrier interferential component removing means for removing an intercarrier interferential component from an OFDM frequency-domain signal which is produced when the FFT process is performed on the OFDM time-domain signal by the FFT processing means, extracting means for extracting pilot signals representative of transmission path characteristics of a transmission path from the OFDM frequency-domain signal from which the intercarrier interferential component is removed by the intercarrier interferential component removing means, transmission path characteristics estimating means for estimating transmission path characteristics represented by pilot signals which are received later, based on the transmission path characteristics represented by the pilot signals extracted by the extracting means, interpolating means for interpolating transmission path characteristics in a frequency direction based on the transmission path characteristics estimated by the transmission path characteristics estimating means thereby to estimate transmission path characteristics for all subcarriers, symbol sequence estimating means for estimating a symbol sequence represented by the OFDM frequency-domain signal which is produced when the FFT process is performed on the OFDM time-domain signal by the FFT processing means, based on the transmission path characteristics for all subcarriers which are estimated by the interpolating means, and interference replica generating means for generating an interference replica representing the intercarrier interferential component to be removed from the OFDM frequency-domain signal by the intercarrier interferential component removing means, based on the symbol sequence estimated by the symbol sequence estimating means and the transmission path characteristics for all subcarriers which are estimated by the interpolating means.

According to the embodiments of the present invention, an FFT process is performed on an OFDM time-domain signal, and an intercarrier interferential component is removed from an OFDM frequency-domain signal which is produced when the FFT process is performed on the OFDM time-domain signal. Pilot signals representative of transmission path characteristics of a transmission path are extracted from the OFDM frequency-domain signal from which the intercarrier interferential component is removed. Transmission path characteristics represented by pilot signals which are received later are estimated based on the transmission path characteristics represented by the extracted pilot signals. Transmission path characteristics are interpolated in a frequency direction based on the estimated transmission path characteristics thereby to estimate transmission path characteristics for all subcarriers. A symbol sequence represented by the OFDM frequency-domain signal which is produced when the FFT process is performed on the OFDM time-domain signal is estimated based on the estimated transmission path characteristics for all subcarriers. An interference replica representing the intercarrier interferential component to be removed from the OFDM frequency-domain signal is generated based on the estimated symbol sequence and the estimated transmission path characteristics for all subcarriers.

According to the present invention, the interferential component can be removed efficiently.

The above and other features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 8:
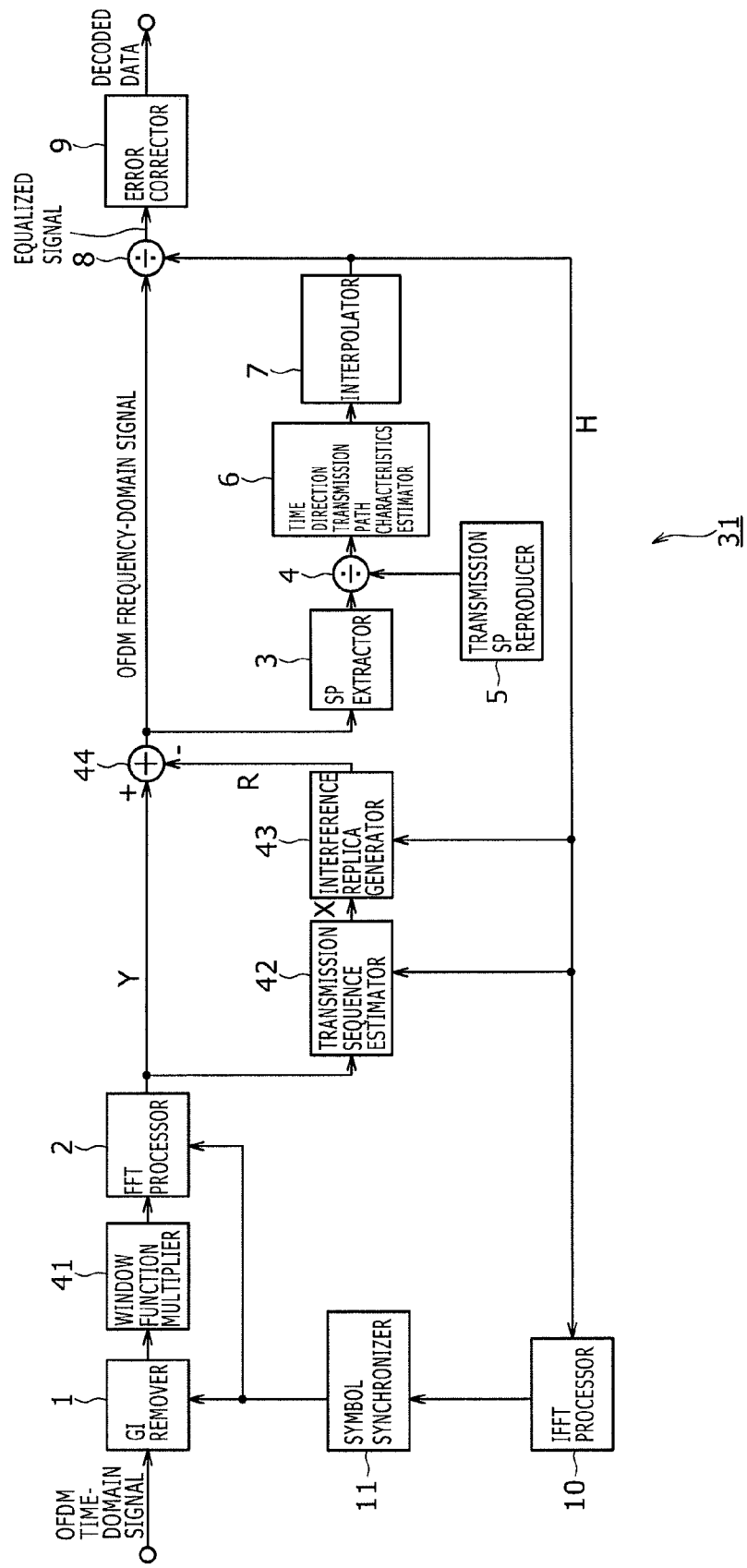
FIG. 8 is a block diagram of a configurational example of an OFDM receiver according to an embodiment of the present invention.

FIG. 8 shows in block form a configurational example of an OFDM receiver 31 as a receiving device according to an embodiment of the present invention.

Figure 3:
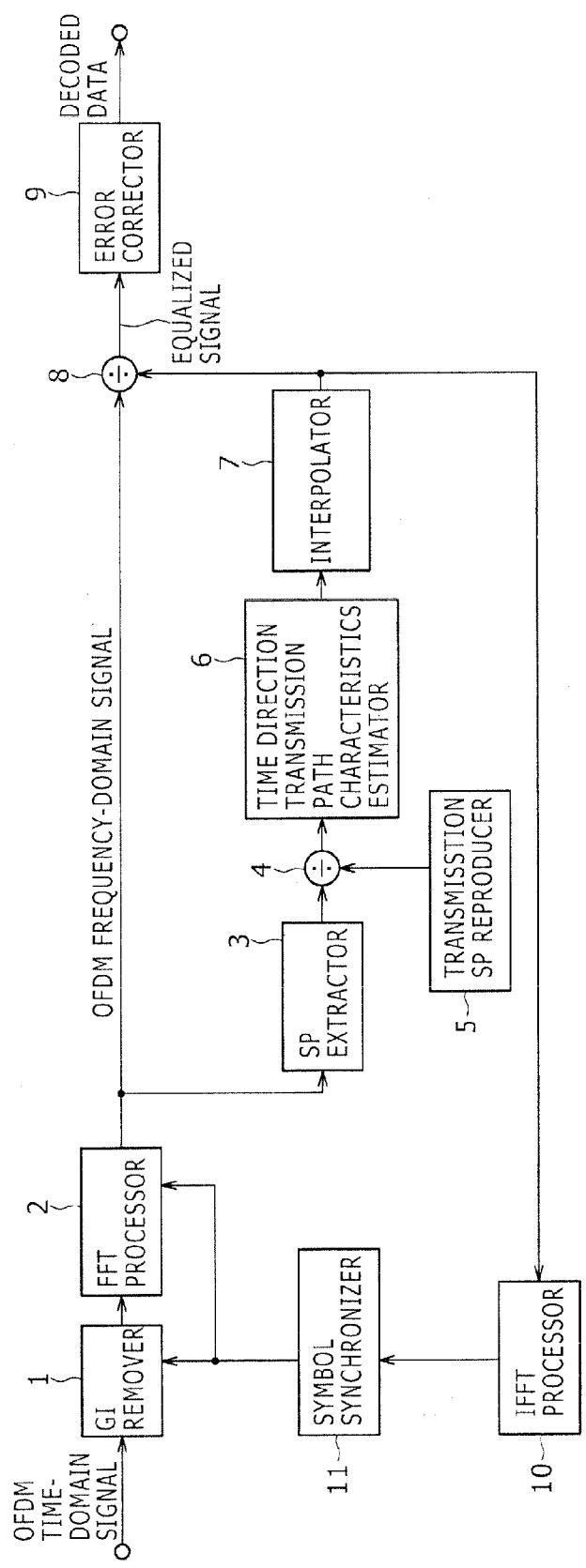
FIG. 3 is a block diagram of a configurational example of an OFDM receiver according to the related art.
Figure 4:
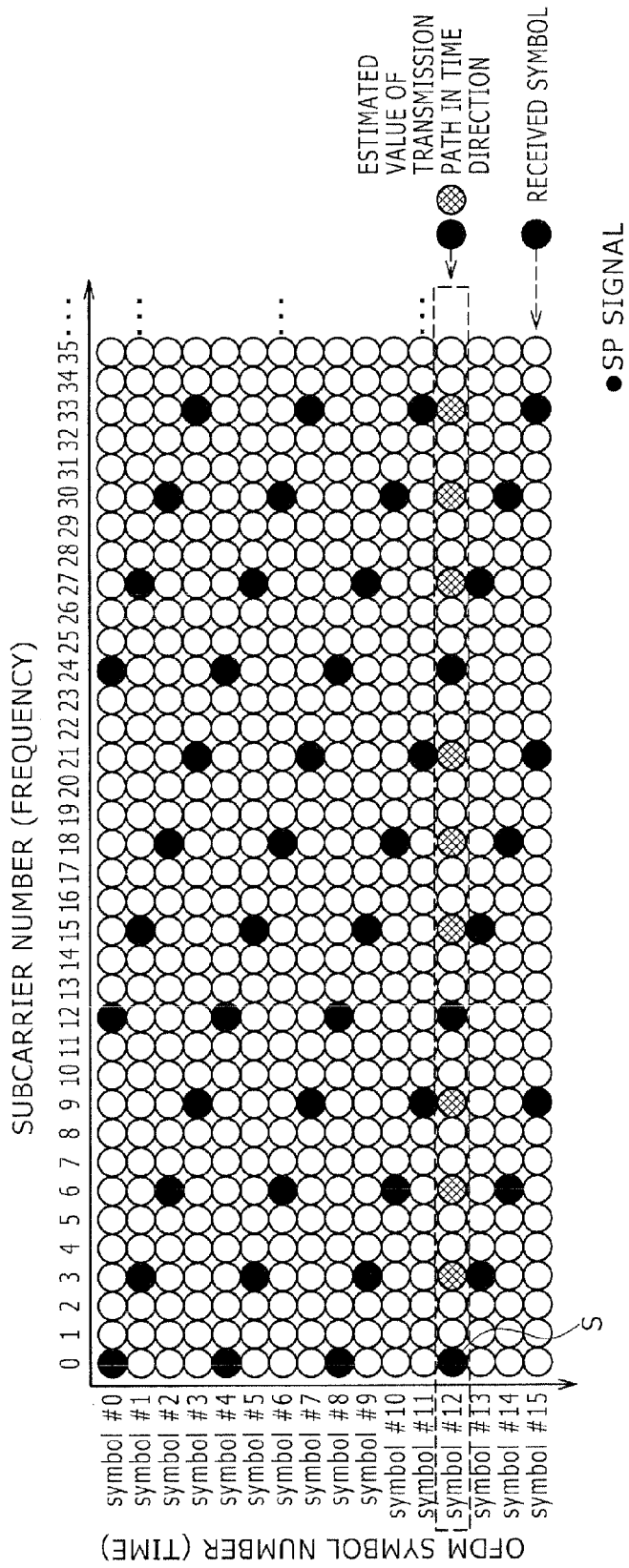
FIG. 4 is a diagram showing by way of example an interpolative method for estimating transmission path characteristics in the time direction.

Those parts of the OFDM receiver 31 shown in FIG. 8 which are identical to those shown in FIG. 3 are denoted by identical reference numerals, and will not be described in detail blow. The OFDM receiver 31 shown in FIG. 3 is different from the OFDM receiver shown in FIG. 3 in that it additionally includes a window function multiplier 41, a transmission sequence estimator 42, an interference replica generator 43, and a subtractor 44.

A broadcast wave received by an antenna, not shown, is processed by a tuner, an A/D converter, and a quadrature demodulator into an OFDM time-domain signal, which is input to the GI remover 1 shown in FIG. 8.

A transmission signal $s_i(t)$ at symbol i and time t is expressed by the following equation (1):

$$s_i(t) = \sum_{k=-K/2}^{K/2} X_{i,k} \cdot \exp[j \cdot 2\pi \cdot n \cdot f_c \cdot (t - n \cdot T_s - T_g)] \quad (1)$$

where X represents a transmission symbol with which each carrier is modulated, K a carrier number, $f_c$ a carrier interval, $T_s$ an effective symbol length, and $T_g$ a GI length.

The GI remover 1 removes the GI from the OFDM time-domain signal according to a timing signal supplied from the symbol synchronizer 11, and outputs an OFDM time-domain signal representative of an effective symbol to the window function multiplier 41.

The window function multiplier 41 multiplies the OFDM time-domain signal by a window function for limiting carriers which are subject to ICIs to a few adjacent carriers. According to the OFDM scheme, it is known that when an OFDM time-domain signal is processed for FFT after it is multiplied by a window function, it is possible to limit carriers which are subject to ICIs to a few adjacent carriers depending on the shape of the window function and also to suppress interference from other carriers than those few carriers.

Figure 9:
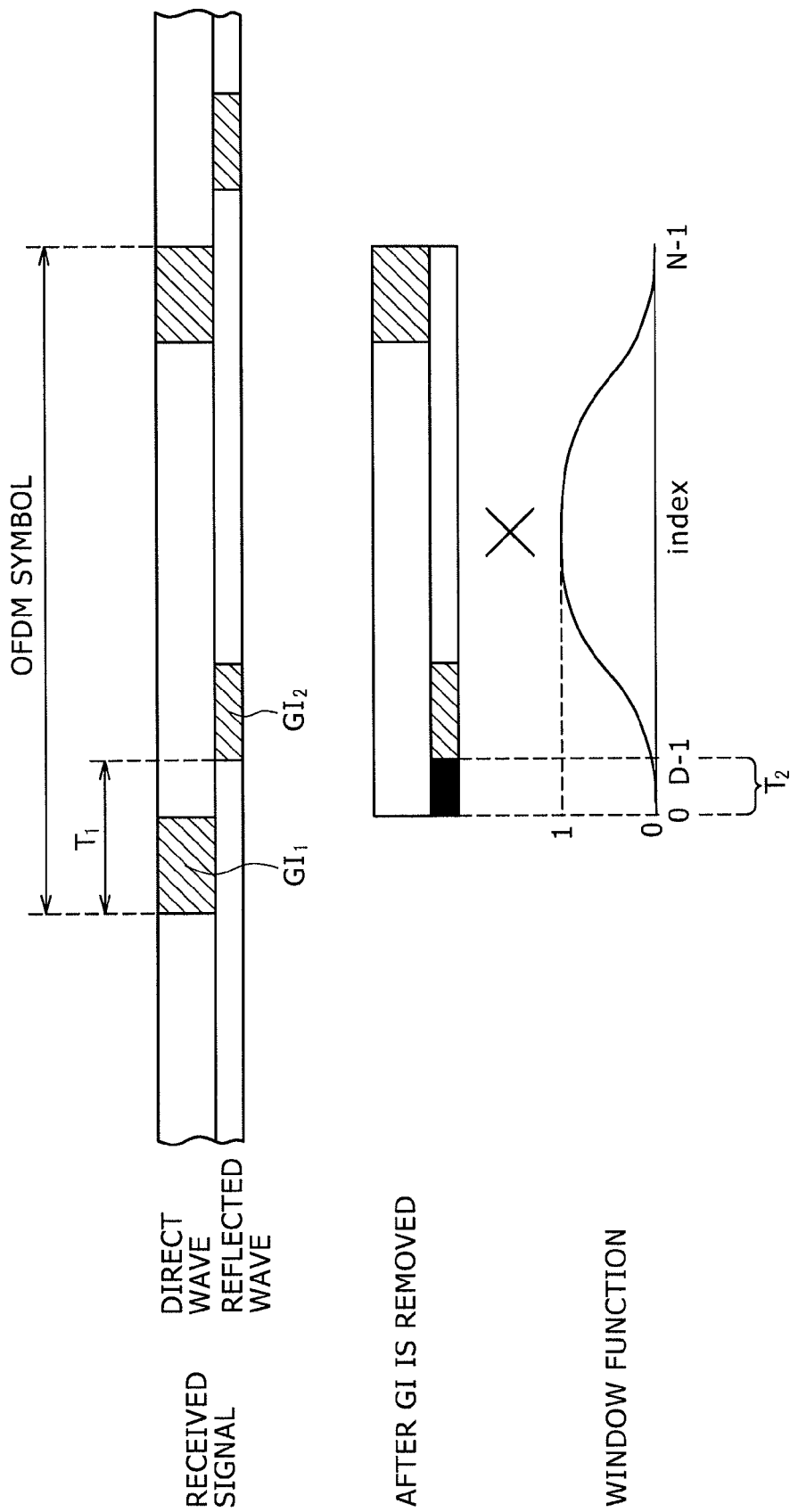
FIG. 9 is a diagram showing a window function by way of example.

FIG. 9 is a diagram showing a window function by way of example.

A direct wave and a reflected wave which are shown in an upper portion of FIG. 9 are OFDM time-domain signals that are received by the OFDM receiver 31. In other words, FIG. 9 illustrates an example in a two-wave environment. Attention is drawn to a symbol shown centrally in the upper portion of FIG. 9. A $GI_1$ shown hatched is the GI of the symbol in question that is transmitted by the direct wave, and a $GI_2$ shown hatched is the GI of the symbol in question that is transmitted by the reflected wave.

In FIG. 9, a band representing the reflected wave is shown as being narrower than a band representing the direct wave because the reflected wave has a smaller amplitude than the direct wave. The horizontal axis of FIG. 9 indicates a time direction. In this example, the reflected wave is delayed by a time corresponding to a zone $T_1$ which exceeds the GIs.

The OFDM time-domain signal is input to the GI remover 1, which removes the GI from the OFDM time-domain signal.

The OFDM time-domain signal from which the GI is removed is shown in a middle portion of FIG. 9. The OFDM time-domain signal from which the GI is removed is to be processed by an FFT process. In this example, the $GI_1$ of the symbol in question that is transmitted by the direct wave is removed. The OFDM time-domain signal from which the GI is removed includes a component of a symbol preceding the symbol in question as a component of the reflected wave, for a time corresponding to a zone $T_2$.

FIG. 9 shows the waveform of the window function in a lower portion thereof. A function that has a length in the time direction which is the same as the effective symbol and that can have a value in the range from 0 to 1 is provided as the window function in the window function multiplier 41. The window function shown in FIG. 9 has smallest values at the opposite ends of the effective symbol, i.e., at the opposite ends of the FFT zone. When the OFDM time-domain signal from which the GI is removed is multiplied by the window function, ISIs are removed from the OFDM time-domain signal.

Figure 10:
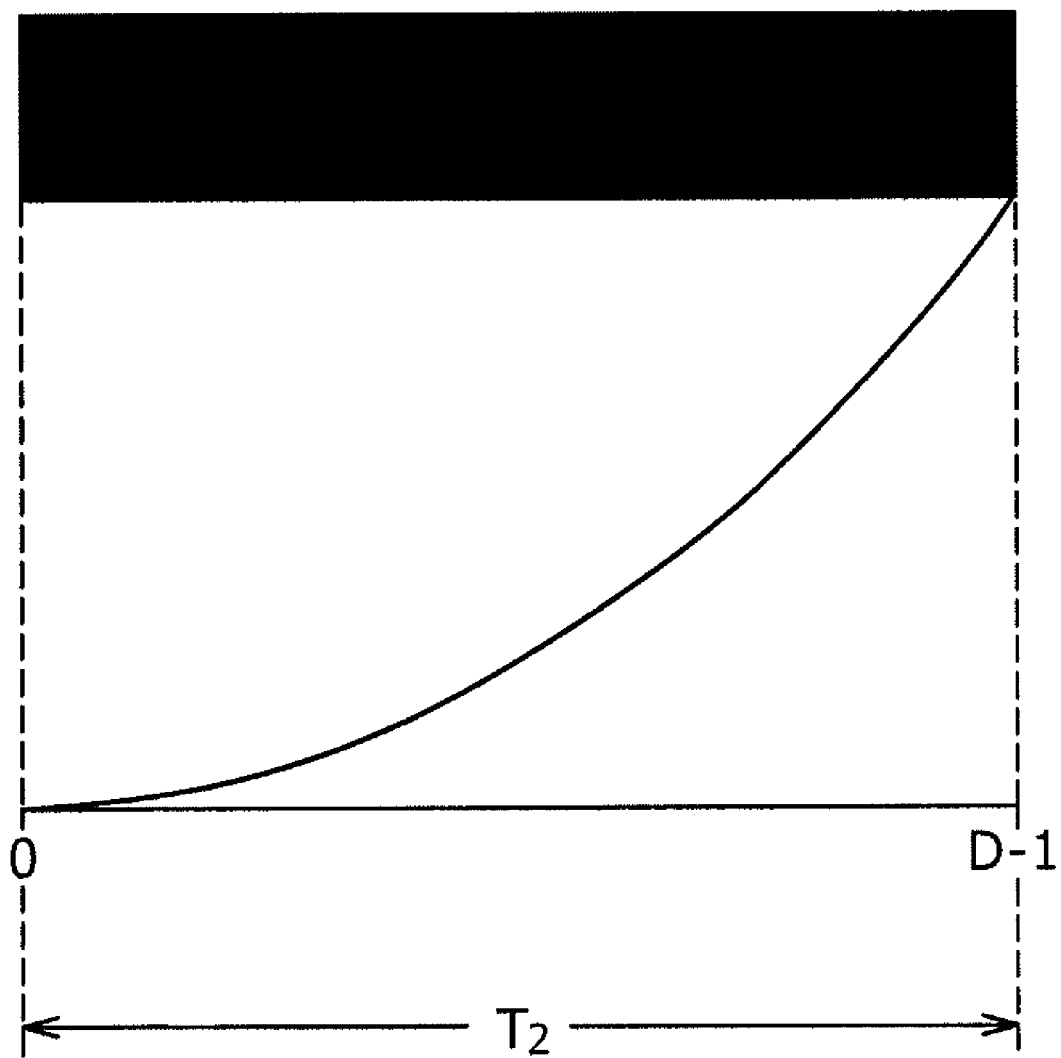
FIG. 10 is an enlarged diagram of a portion in zone $T_2$ shown in FIG. 9.

FIG. 10 is an enlarged diagram of a portion of the window function and a portion of the OFDM time-domain signal from which the GI is removed, which are included in the zone $T_2$ shown in FIG. 9.

In FIG. 10, the component of the symbol preceding the symbol in question, which is included in the OFDM time-domain signal from which the GI is removed, is shown solid. A residual ISI power level which is not removed even when the OFDM time-domain signal from which the GI is removed is multiplied by the window function is indicated by the area of a portion of the band which overlaps the window function when the band shown solid and the window function overlap each other.

When the OFDM time-domain signal from which the GI is thus removed is multiplied by the window function prior to the FFT process, the ICIs are limited to those from a few adjacent carriers, and the ISIs are suppressed. The window function multiplier 41 outputs the OFDM time-domain signal produced by being multiplied by the window function to the FFT processor 2.

The FFT processor 2 performs the FFT process on the OFDM time-domain signal supplied from the window function multiplier 41, and outputs an OFDM frequency-domain signal. The OFDM frequency-domain signal output from the FFT processor 2 is supplied to the transmission sequence estimator 42 and the subtractor 44.

If the carriers which are subject to ICIs are limited to only adjacent carriers by multiplying the OFDM time-domain signal by the window function, then the OFDM frequency-domain signal $Y_{i,h}$ produced by the FFT process is expressed by the following equation (2):

$$Y_{i,h} = \left( \sum_{n=-1}^{+1} H_{i,h+n} \cdot X_{i,h+n} \cdot W_n \right) + \varepsilon_{ICI} + \eta_{ISI} \quad (2)$$

$$\cong H_{i,h-1} \cdot X_{i,h-1} \cdot W_{-1} + H_{i,h} \cdot X_{i,h} + H_{i,h+1} \cdot X_{i,h+1} \cdot W_{+1}$$

where i represents a symbol number, h a subcarrier number, $\varepsilon_{ICI}$ an ICI component, and $\eta_{ISI}$ an ISI component. The values of $\varepsilon_{ICI}$, $\eta_{ISI}$ are sufficiently small as the OFDM time-domain signal is multiplied by the window function.

In the equation (2), $H_{i,h}$ represents the frequency characteristics of a transmission path at the position identified by the symbol number i and the subcarrier number h. The frequency characteristics $H_{i,h}$ are estimated by a circuit at a subsequent stage. In the equation (2), W represents the frequency characteristics of the window function. For the sake of brevity, the frequency characteristics W are standardized to $W_0=1$.

In the equation (2), $H_{i,h-1} \cdot X_{i,h-1}$ represents an interferential component of an adjacent subcarrier which precedes a subcarrier in question according to the carrier number sequence, and $H_{i,h+1} \cdot X_{i,h+1}$ represents an interferential component of an adjacent subcarrier which follows the subcarrier in question according to the carrier number sequence. The components represented by $H_{i,h-1} \cdot X_{i,h-1}$, $H_{i,h+1} \cdot X_{i,h+1}$ are components to be removed.

The transmission sequence estimator 42 estimates a transmission symbol sequence using the OFDM frequency-domain signal supplied from the FFT processor 2 and the estimated values of the transmission path characteristics for all the subcarriers which are represented by the signal supplied from the interpolator 7. One known method for estimating a transmission symbol sequence is the MLSE (Maximum Likelihood Sequence Estimation) method. The transmission sequence estimator 42 outputs the estimated transmission symbol sequence to the interference replica generator 43.

The interference replica generator 43 generates an interference replica $R_{i,h}$ using the transmission symbol sequence supplied from the transmission sequence estimator 42 and the estimated values of the transmission path characteristics for all the subcarriers which are represented by the signal supplied from the interpolator 7, according to the following equation (3):

$$R_{i,h} = \hat{H}_{i,h-1} \cdot \hat{X}_{i,h-1} \cdot W_{-1} + \hat{H}_{i,h+1} \cdot \hat{X}_{i,h+1} \cdot W_{+1} \qquad (3)$$

Of the values included in the equation (3), the values with "^" are estimated values. The estimated values of $H_{i,h-1}$ and the estimated values of $H_{i,h+1}$ are determined by the interpolator 7, and the estimated values of $X_{i,h-1}$ and the estimated values of $X_{i,h+1}$ are determined by the transmission sequence estimator 42. $W_{-1}$, $W_{+1}$, which are of known values, represent the frequency characteristics of the window function.

The interference replica generator 43 outputs a signal representative of the interference replica thus generated to the subtractor 44.

The subtractor 44 subtracts the signal representative of the interference replica from the OFDM frequency-domain signal supplied from the FFT processor 2, thereby generating an OFDM frequency-domain signal from which the interference is removed. The OFDM frequency-domain signal from which the interference is removed is expressed by the following equation (4):

$$\tilde{Y}_{i,h} = Y_{i,h} - R_{i,h} = H_{i,h} \cdot X_{i,h} + \xi_{i,h} \qquad (4)$$

where $\xi_{i,h}$ represents an error corresponding to the values of $\epsilon_{ICI}$, $\eta_{ISI}$.

In this manner, the OFDM frequency-domain signal from which interference is removed or suppressed is generated. The subtractor 44 outputs the generated OFDM frequency-domain signal to the SP extractor 3 and the complex divider 8.

The SP extractor 3 extracts SP signals from the OFDM frequency-domain signal supplied from the subtractor 44 and outputs the SP signals to the complex divider 4.

The complex divider 4 divides the SP signals supplied from the SP extractor 3 by SP signals reproduced by a transmission SP reproducer 5 to thereby calculate transmission path characteristics at the positions where the SP signals are inserted. The complex divider 4 outputs a signal representative of the calculated transmission path characteristics to the time direction transmission path characteristics estimator 6.

The transmission SP reproducer 5 reproduces SP signals and outputs the reproduced SP signals to the complex divider 4.

The time direction transmission path characteristics estimator 6 estimates transmission path characteristics in the time direction according to the predictive estimating method of the interpolative estimation method and the predictive estimating method referred to above. Specifically, the time direction transmission path characteristics estimator 6 estimates transmission path characteristics for subcarriers where the SP signals are inserted, based on the transmission path characteristics represented by the signal supplied from the complex divider 4. The time direction transmission path characteristics estimator 6 outputs a signal representative of the estimated values of transmission path characteristics for every 3 subcarriers to the interpolator 7.

Since the predictive estimating method is a method for estimating transmission path characteristics at a subsequent position using the transmission path characteristics estimated by already received SP signals, the accuracy of the transmission path characteristics used as a basis for estimation should preferably be high.

The accuracy with which to estimate transmission path characteristics is increased because the OFDM time-domain signal is multiplied by the window function and the transmission path characteristics are estimated from the OFDM frequency-domain signal that is produced by removing the interference from the OFDM frequency-domain signal using the interference replica. The increased accuracy with which to estimate transmission path characteristics leads to an increase in the accuracy with which the transmission sequence estimator 42 estimates a transmission symbol sequence, which further leads to an increase in the accuracy with which to estimate transmission path characteristics.

The interpolator 7 determines transmission path characteristics for subcarriers where no SP signals are inserted, based on the estimated values of the transmission path characteristics which are represented by the signal supplied from the time direction transmission path characteristics estimator 6, and outputs a signal representative of the estimated values of the transmission path characteristics determined for all the subcarriers. The signal output from the interpolator 7 is supplied to the complex divider 8, the IFFT processor 10, the transmission sequence estimator 42, and the interference replica generator 43.

The complex divider 8 divides the OFDM frequency-domain signal supplied from the subtractor 44 by the signal supplied from the interpolator 7, thereby compensating for the transmission path distortion, and outputs an equalized signal to the error corrector 9. The equalized signal is expressed by the following equation (5):

$$\tilde{X}_{i,h} = \tilde{Y}_{i,h} / \hat{H}_{i,h} = (H_{i,h} / \hat{H}_{i,h}) \cdot X_{i,h} + (\xi_{i,h} / \hat{H}_{i,h}) \qquad (5)$$

The error corrector 9 performs predetermined processes such as a deinterleaving process, etc. on the equalized signal to generate decoded data, and outputs the decoded data to a circuit at a subsequent stage.

The IFFT processor 10 performs an IFFT process on the signal representative of the transmission path characteristics which is supplied from the interpolator 7, thereby determining an impulse response of the transmission path using all or part of the transmission path characteristics estimated for all the subcarriers after the FFT process. The IFFT processor 10 then outputs a signal representative of the determined impulse response of the transmission path to the symbol synchronizer 11.

The symbol synchronizer 11 detects the boundary between symbols from the impulse response of the transmission path which is represented by the signal supplied from the IFFT processor 10, and outputs a timing signal to the GI remover 1 and the FFT processor 2.

Figure 11:
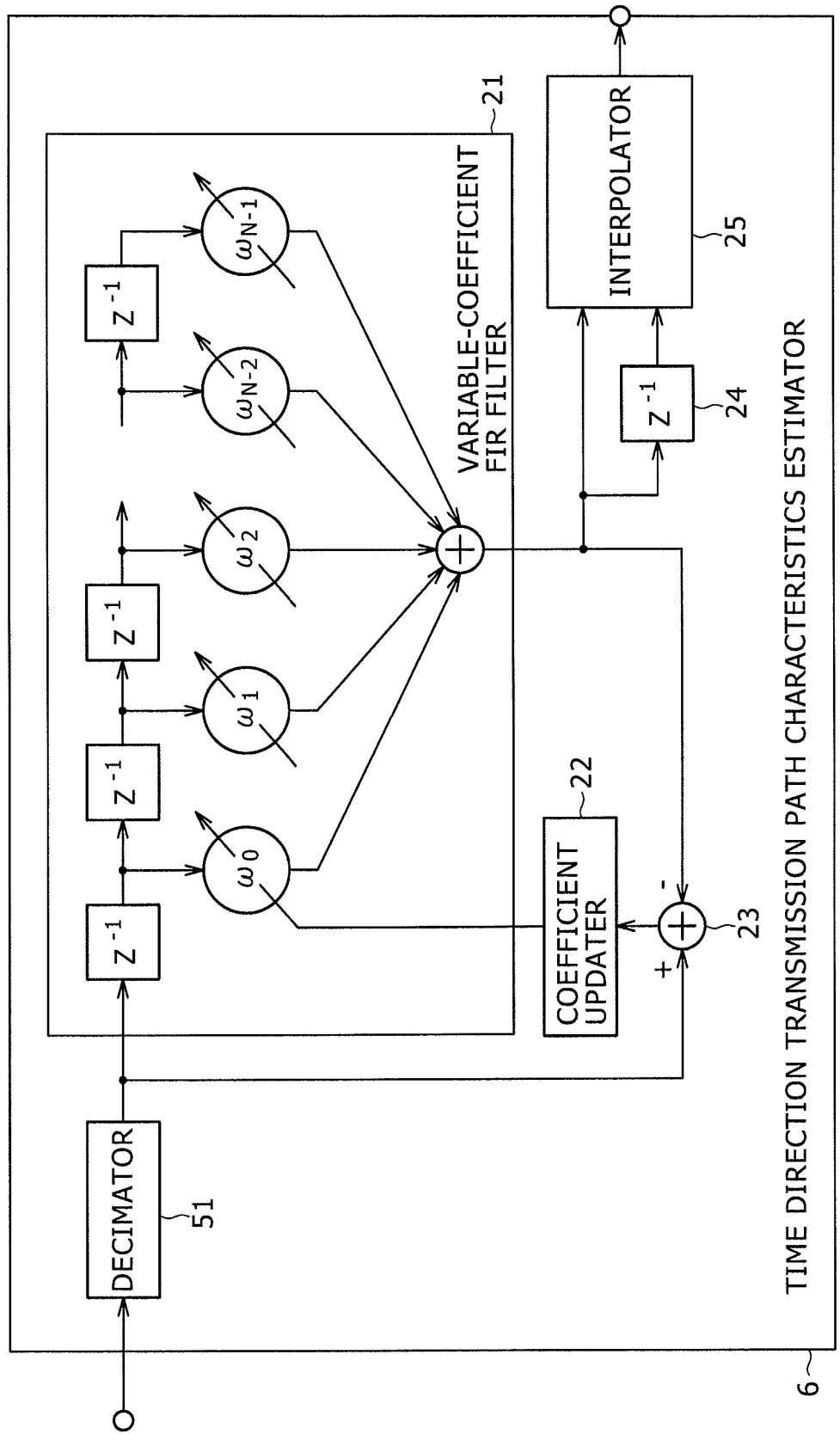
FIG. 11 is a block diagram of a configurational example of a time direction transmission path characteristics estimator shown in FIG. 8.

FIG. 11 is a block diagram of a configurational example of the time direction transmission path characteristics estimator 6 shown in FIG. 8 which estimates transmission path characteristics in the time direction according to the predictive estimating method.

Figure 6:
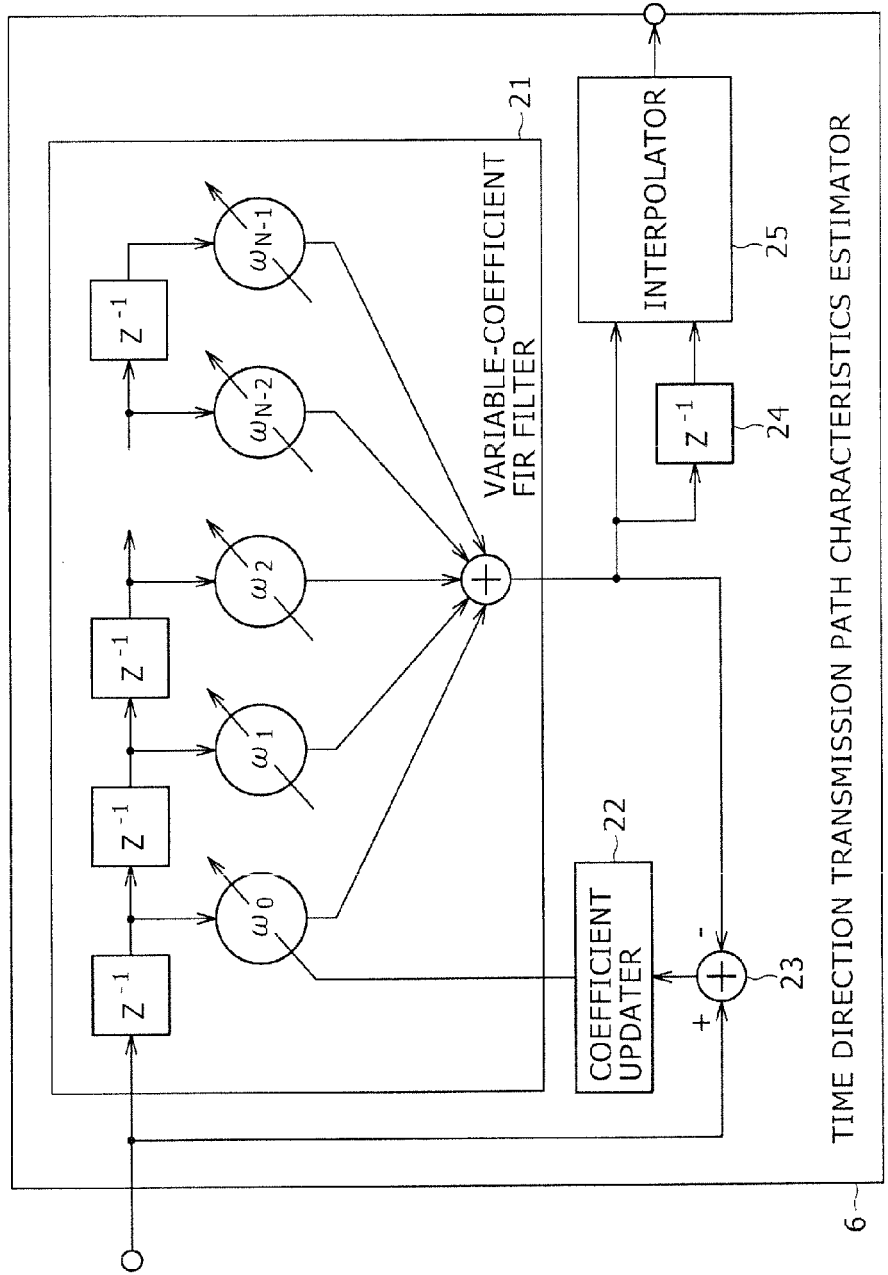
FIG. 6 is a block diagram of a configurational example of a time direction transmission path characteristics estimator shown in FIG. 3.
Figure 7:
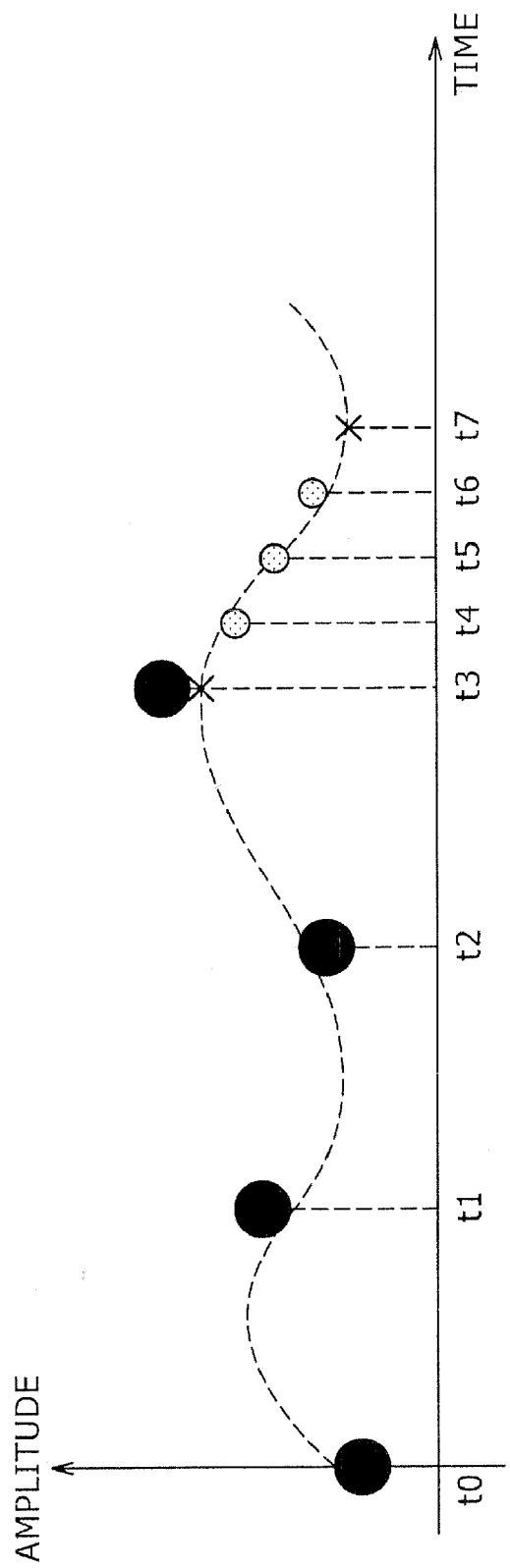
FIG. 7 is a diagram showing the manner in which transmission path characteristics are estimated.

Those parts of the time direction transmission path characteristics estimator 6 shown in FIG. 11 which are identical to those shown in FIG. 6 are denoted by identical reference numerals, and will not be described in detail blow. The time direction transmission path characteristics estimator 6 shown in FIG. 11 is different from the time direction transmission path characteristics estimator 6 shown in FIG. 6 in that it additionally includes a decimator 51.

Figure 5:
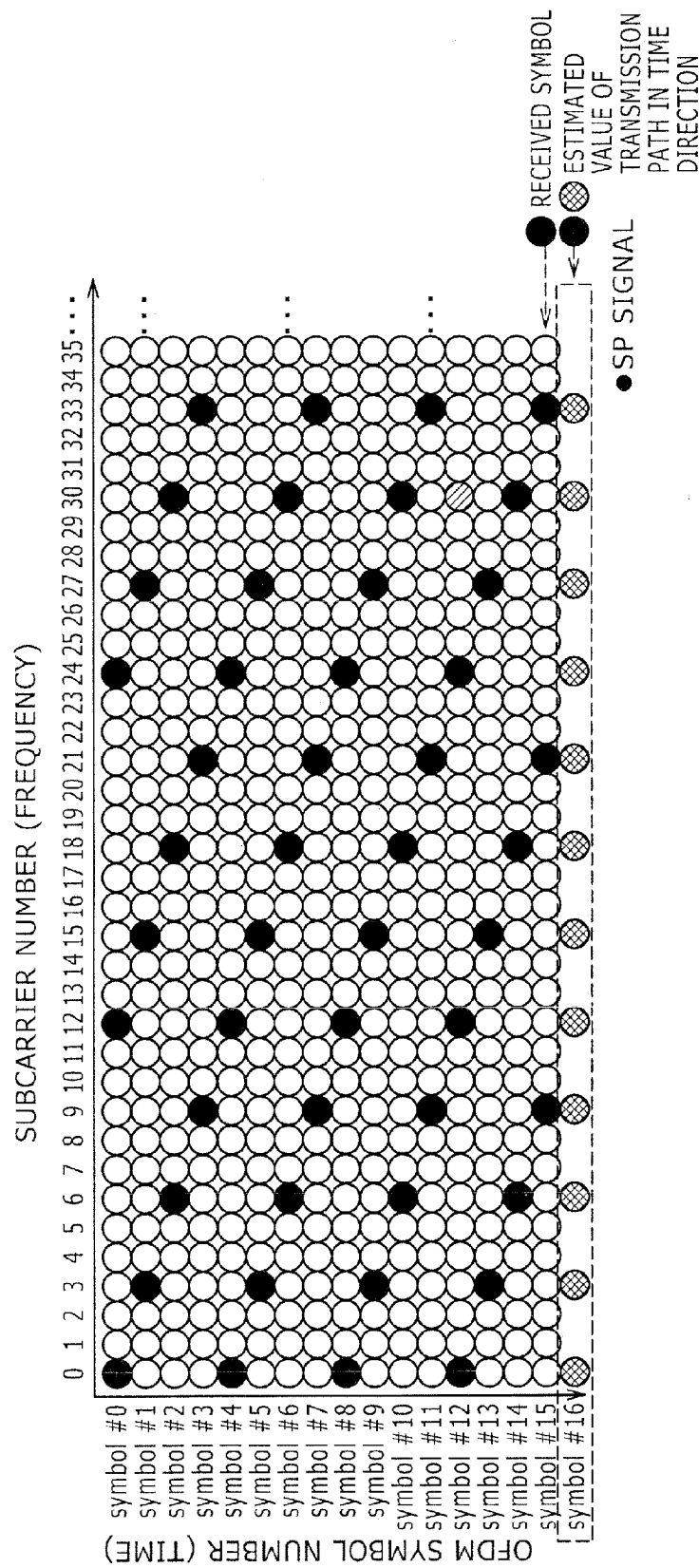
FIG. 5 is a diagram showing by way of example a predictive method for estimating transmission path characteristics in the time direction.

The signal representative of the estimated values of the transmission path characteristics which is output from the complex divider 4 is input to the decimator 51. For example, signals representative of the estimated values of the transmission path characteristics at the respective positions of symbols $S_{0,0}$, $S_{4,0}$, $S_{8,0}$, $S_{12,0}$ shown in FIG. 5 are successively input to the decimator 51.

The decimator 51 decimates estimated values of the transmission path characteristics determined from the already received SP signals at a predetermined rate, and outputs a signal representative of estimated values which is not decimated. The decimation performed by the decimator 51 is essentially the same as decimating the SP signals.

For example, if twofold decimation is performed, the estimated values of the transmission path characteristics which are represented by the signal output from the decimator 51 are spaced at 8-symbol intervals. The signal output from the decimator 51 is input to the variable-coefficient FIR filter 21 and the subtractor 23.

The variable-coefficient FIR filter 21 filters the input signal using coefficients updated by the coefficient updater 22, and outputs a signal representative of the estimated values of the transmission path characteristics. The signal output from the variable-coefficient FIR filter 21 is supplied to the subtractor 23, the delay circuit 24, and the interpolator 25.

The coefficient updater 22 updates the tap coefficients of the variable-coefficient FIR filter 21 based on a signal supplied from the subtractor 23.

The subtractor 23 calculates the difference between the signal supplied from the complex divider 4 and the signal supplied from the variable-coefficient FIR filter 21, and outputs a signal representative of the calculated difference to the coefficient updater 22.

The delay circuit 24 delays the signal supplied from the variable-coefficient FIR filter 21 by the product of the decimating ratio of the decimator 51 and 4 symbols, and outputs the delayed signal to the interpolator 25.

The interpolator 25 estimates, by way of interpolation, transmission path characteristics at respective times between two SP signals received at earlier and later times, based on estimated values of the transmission path characteristics at the positions where the SP signals are inserted.

If twofold decimation is performed, as described above, then the input transmission path characteristics are spaced at 8-symbol intervals. Therefore, a maximum value of time variations that can be estimated is one-half of the maximum value of time variations at the time the estimated values of the transmission path characteristics are spaced at 4-symbol intervals. However, since the transmission path characteristics are estimated using distant data, it is possible to reduce a band which needs to be kept as the band of the variable-coefficient FIR filter 21.

Figure 1:
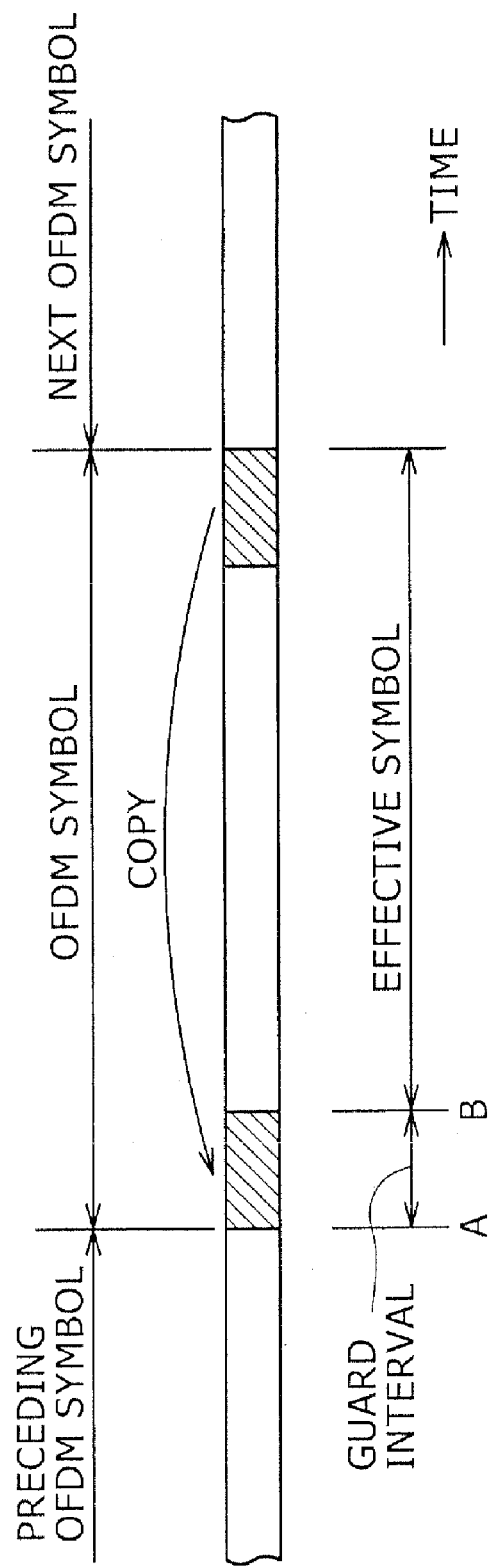
FIG. 1 is a diagram showing OFDM symbols.
Figure 2:
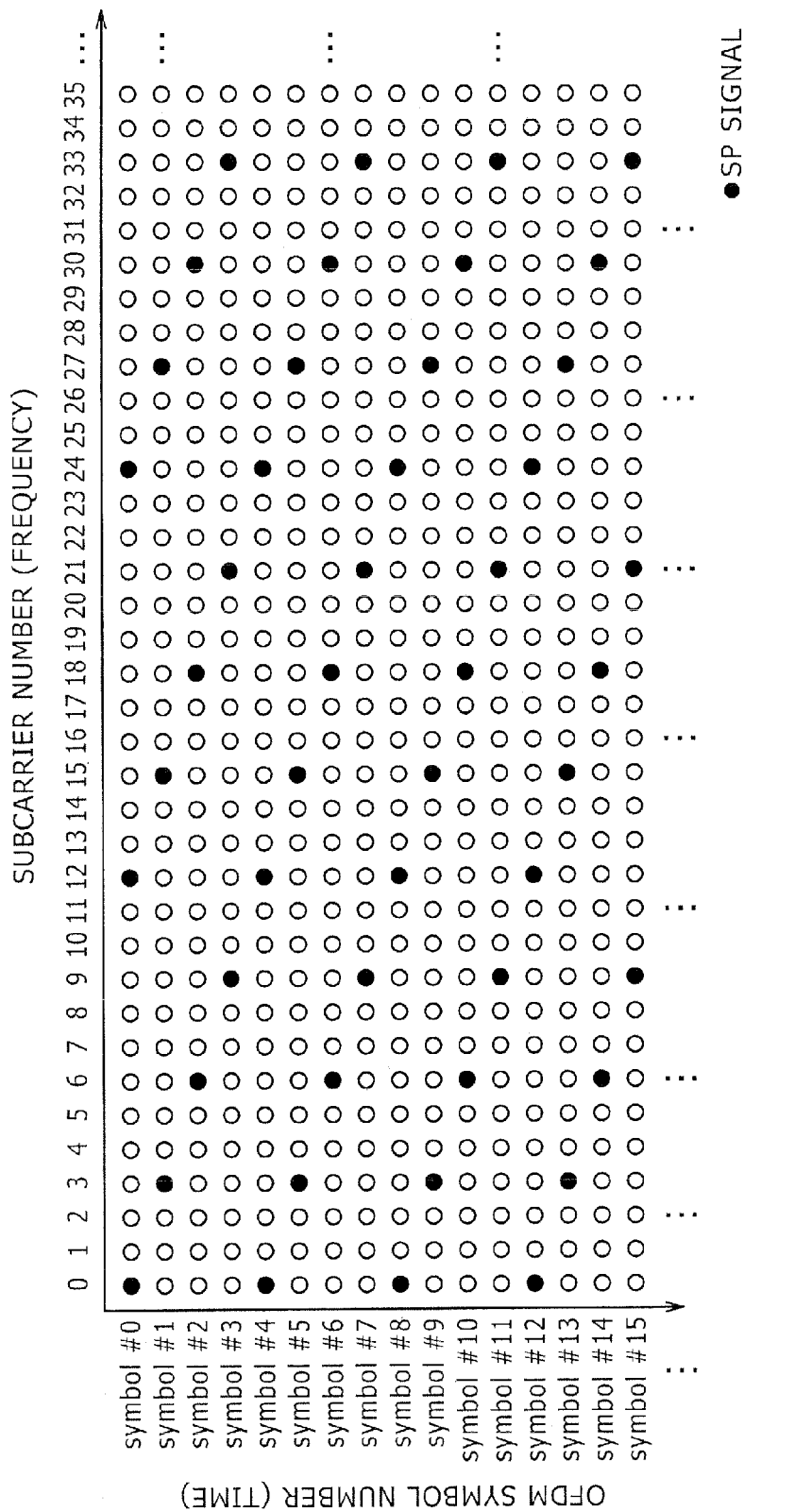
FIG. 2 is a diagram showing a layout pattern of SP signals.

For example, if the SP signals are positioned as shown in FIG. 2, then the SP signals are inserted for every 4 symbols in the time direction. Consequently, if transmission path characteristics are estimated by the variable-coefficient FIR filter 21 using all the SP signals, then it is possible to estimate them up to time variations of $1/(8*T_s)$ Hz, which can be changed by the decimating ratio, where $T_s$ represents one symbol length.

Furthermore, not only the band of the variable-coefficient FIR filter 21 can be reduced, but the noise removal capability thereof can be increased.

Figure 12:
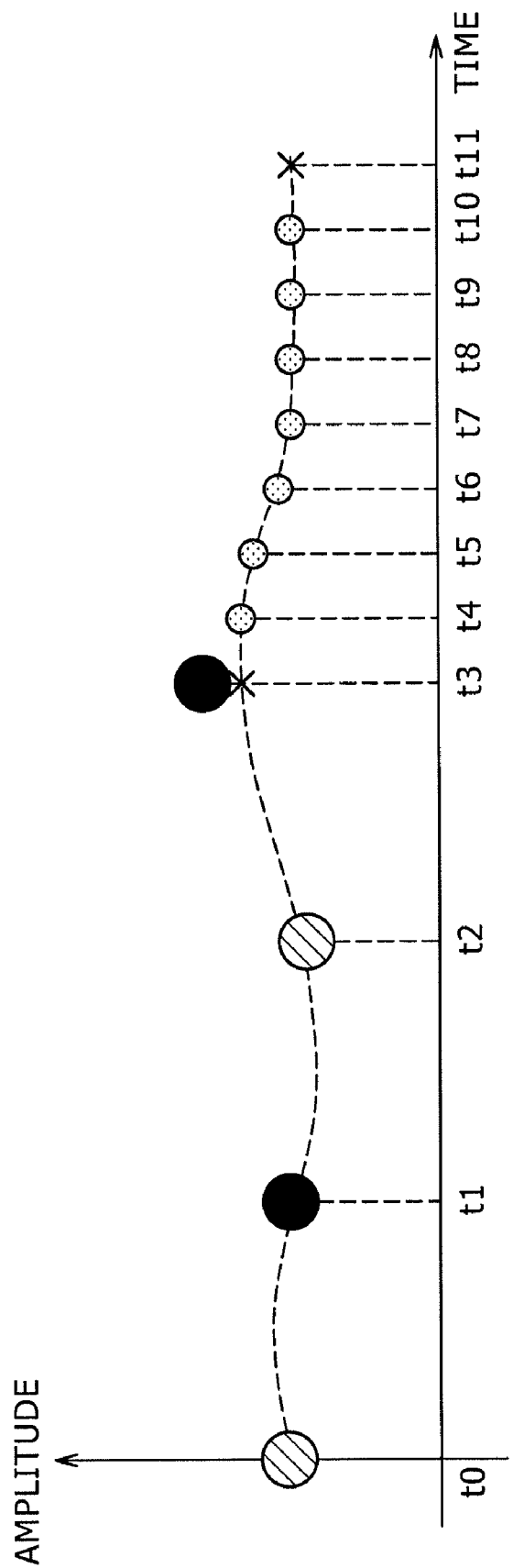
FIG. 12 is a diagram showing the manner in which transmission path characteristics are estimated.

FIG. 12 is a diagram showing the manner in which transmission path characteristics are estimated.

The horizontal axis of FIG. 12 represents time. Different positions along the vertical axis of SP signals that are received respectively at times $t_0$, $t_1$, $t_2$, . . . indicate that the SP signals have suffered transmission path characteristics variations.

In the example shown in FIG. 12, of the estimated values of the transmission path characteristics which are determined by the SP signals received at times $t_0$, $t_1$, $t_2$, $t_3$, the estimated values determined by the SP signals received at times $t_0$, $t_2$ are decimated by the decimator 51.

It is assumed that the present time is indicated by time $t_3$ and the variable-coefficient FIR filter 21 estimates, from the transmission path characteristics at the position where an SP signal received at time $t_3$ is inserted, transmission path characteristics at the position where the SP signal received at time $t_{11}$, which is an SP signal received after the next, is inserted. The interpolator 25 estimates, by way of linear interpolation, for example, transmission path characteristics at respective times $t_4$ through $t_{10}$ based on the transmission path characteristics at the position where the SP signal received at time $t_3$ is inserted and the transmission path characteristics at the position where the SP signal received at time $t_{11}$ is inserted.

The above configuration for estimating transmission path characteristics in the time direction after the decimation is used in the case where time-dependent variations of the frequency characteristics of the target transmission path are sufficiently slow. The configuration is applicable to not only a circuit based on the predictive estimating method, but also a circuit based on the interpolative estimating method.

A processing sequence of the OFDM receiver 31 thus constructed will be described below.

Figure 13:
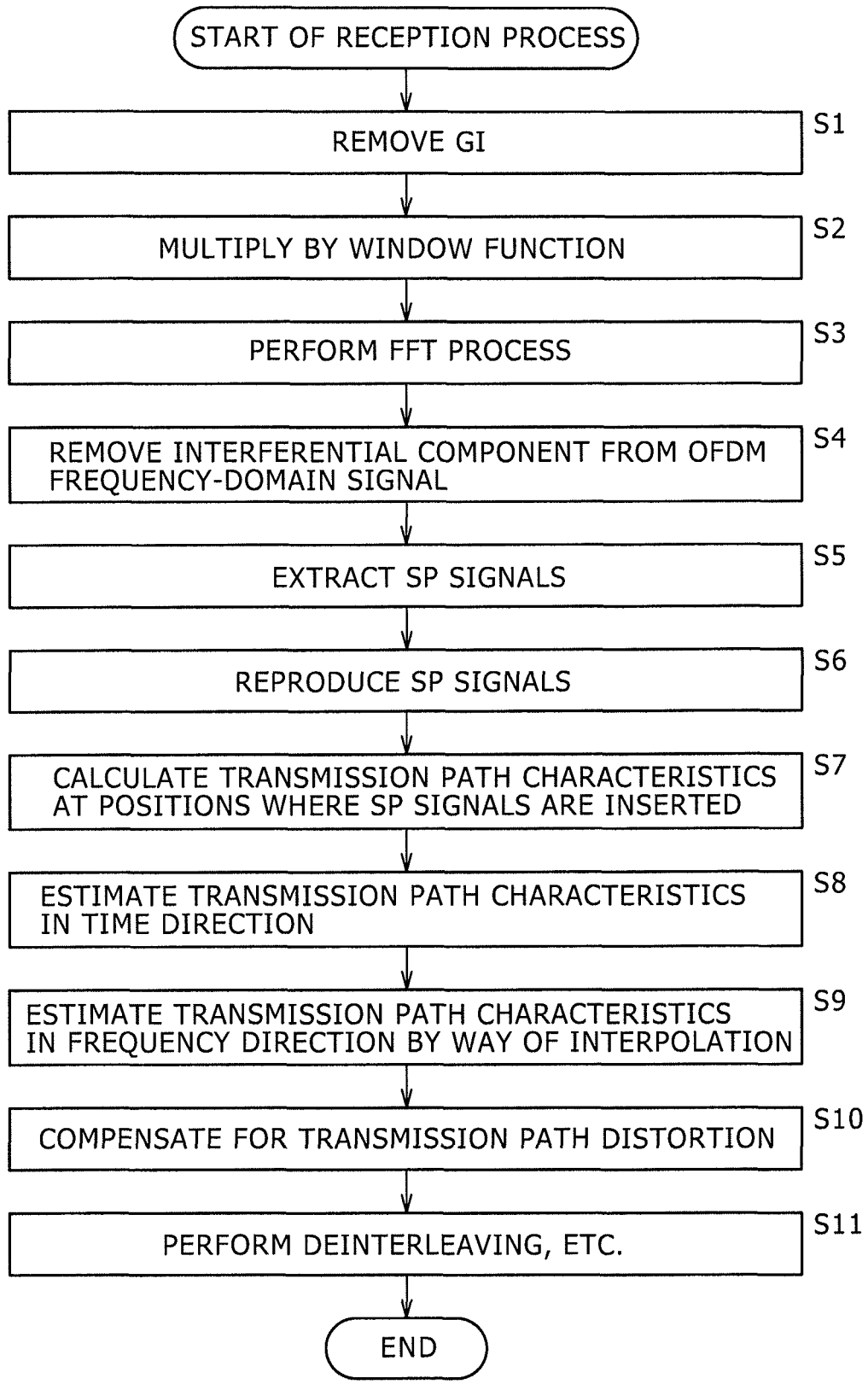
FIG. 13 is a flowchart of a reception process performed by the OFDM receiver.

First, a reception process performed by the OFDM receiver 31 will be described below with reference to a flowchart shown in FIG. 13. Each of the steps of the sequence shown in FIG. 13 may be carried out concurrently with or earlier or later than another step of the sequence shown in FIG. 13 or a sequence shown in FIG. 14. Each of the steps of the sequence shown in FIG. 14 may similarly be carried out concurrently with or earlier or later than another step of the sequence shown in FIG. 14 or the sequence shown in FIG. 13.

In step S1, the GI remover 1 removes a GI from the OFDM time-domain signal, and outputs an OFDM time-domain signal representative of effective symbols to the window function multiplier 41.

In step S2, the window function multiplier 41 multiplies the OFDM time-domain signal supplied from the GI remover 1 by the window function, and outputs a produced OFDM time-domain signal as a signal to be processed for FFT to the FFT processor 2.

In step S3, the FFT processor 2 performs the FFT process on the OFDM time-domain signal supplied from the window function multiplier 41, and outputs an OFDM frequency-domain signal.

In step S4, the subtractor 44 subtracts a signal representative of an interference replica from the OFDM frequency-domain signal supplied from the FFT processor 2, thereby removing an interferential component from the OFDM frequency-domain signal. The subtractor 44 is supplied with the signal representative of the interference replica from the interference replica generator 43. The subtractor 44 outputs an OFDM frequency-domain signal from which the interferential component is removed.

In step S5, the SP extractor 3 extracts SP signals from the OFDM frequency-domain signal supplied from the subtractor 44, and outputs the extracted SP signals to the complex divider 4.

In step S6, the transmission SP reproducer 5 reproduces SP signals and outputs the reproduced SP signals to the complex divider 4.

In step S7, the complex divider 4 divides the SP signals supplied from the SP extractor 3 by the SP signals reproduced by the transmission SP reproducer 5 to thereby calculate transmission path characteristics at the positions where the SP signals are inserted. The complex divider 4 outputs a signal representative of the calculated transmission path characteristics to the time direction transmission path characteristics estimator 6.

In step S8, the time direction transmission path characteristics estimator 6 estimates transmission path characteristics for every 3 subcarriers based on the transmission path characteristics represented by the signal supplied from the complex divider 4, and outputs a signal representative of the estimated values of the transmission path characteristics to the interpolator 7.

In step S9, the interpolator 7 interpolates, in the frequency direction, the estimated values of the transmission path characteristics which are represented by the signal supplied from the time direction transmission path characteristics estimator 6, thereby estimating transmission path characteristics for subcarriers where no SP signals are inserted. The interpolator 7 outputs a signal representative of the estimated values of the transmission path characteristics for all the subcarriers.

In step S10, the complex divider 8 divides the OFDM frequency-domain signal supplied from the subtractor 44 by the signal supplied from the interpolator 7, thereby compensating for the transmission path distortion included in the OFDM frequency-domain signal. The complex divider 8 outputs an equalized signal produced by compensating for the transmission path distortion to the error corrector 9.

In step S11, the error corrector 9 performs predetermined processes such as a deinterleaving process, etc. on the equalized signal. Thereafter, the reception process is put to an end. While the OFDM receiver 31 is receiving the signal, the processing sequence shown in FIG. 13 is repeated.

Figure 14:
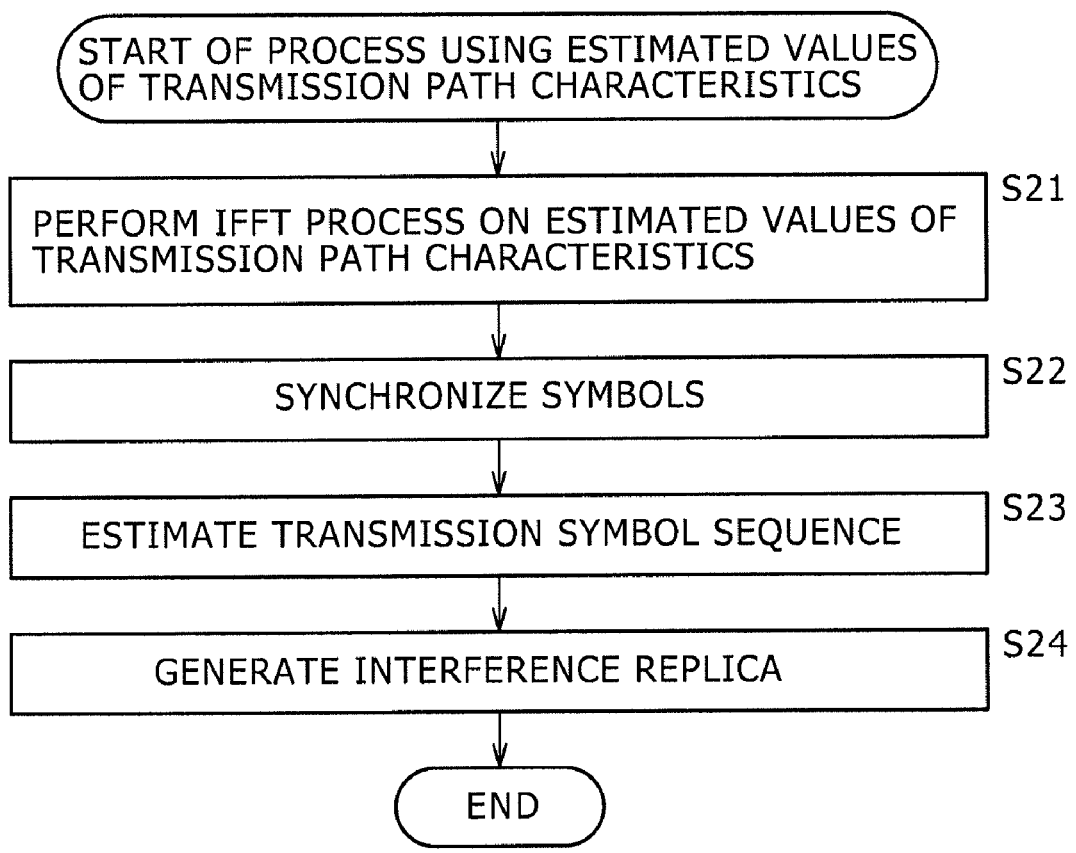
FIG. 14 is a flowchart of a processing sequence using estimated values of transmission path characteristics.

A processing sequence using the estimated values of the transmission path characteristics for all the subcarriers which are produced in step S9 will be described below with reference to a flowchart shown in FIG. 14.

In step S21, the IFFT processor 10 performs an IFFT process on the signal representative of the transmission path characteristics estimated for all the subcarriers by the interpolator 7, thereby determining an impulse response of the transmission path. The IFFT processor 10 then outputs a signal representative of the determined impulse response of the transmission path to the symbol synchronizer 11.

In step S22, the symbol synchronizer 11 detects the boundary between symbols from the impulse response of the transmission path, and outputs a timing signal to the GI remover 1 and the FFT processor 2. The timing signal output from the symbol synchronizer 11 is used in the process for removing the GI in step S1 shown in FIG. 13 and also in the FFT process in step S3 shown in FIG. 13.

In step S23, the transmission sequence estimator 42 estimates a transmission symbol sequence using the OFDM frequency-domain signal supplied from the FFT processor 2 and the estimated values of the transmission path characteristics for all the subcarriers, and outputs the estimated transmission symbol sequence to the interference replica generator 43.

In step S24, the interference replica generator 43 generates an interference replica using the transmission symbol sequence supplied from the transmission sequence estimator 42 and the estimated values of the transmission path characteristics for all the subcarriers, and outputs a signal representative of the generated interference replica. The signal output from the interference replica generator 43 is used in the process for removing the interferential component from the OFDM frequency-domain signal in step S4 shown in FIG. 13.

The above processing sequences make it possible to remove the interferential component efficiently without the need for an increase in the circuit scale of the OFDM receiver 31. The transmission path characteristics can be estimated with high accuracy using the OFDM frequency-domain signal from which the interferential component is removed, and the transmission symbol sequence can also be estimated with high accuracy using the highly accurate estimated values of the transmission path characteristics. The transmission symbol sequence which is estimated with high accuracy is also effective to remove the interferential component efficiently.

The OFDM receiver 31 is also capable of removing or suppressing multipaths in excess of the GI which are produced in an environment such as an SFN and also removing or suppressing interferences which are produced by transmission paths that suffer time-dependent variations in a mobile reception environment, and hence has increased reception characteristics.

Figure 15:
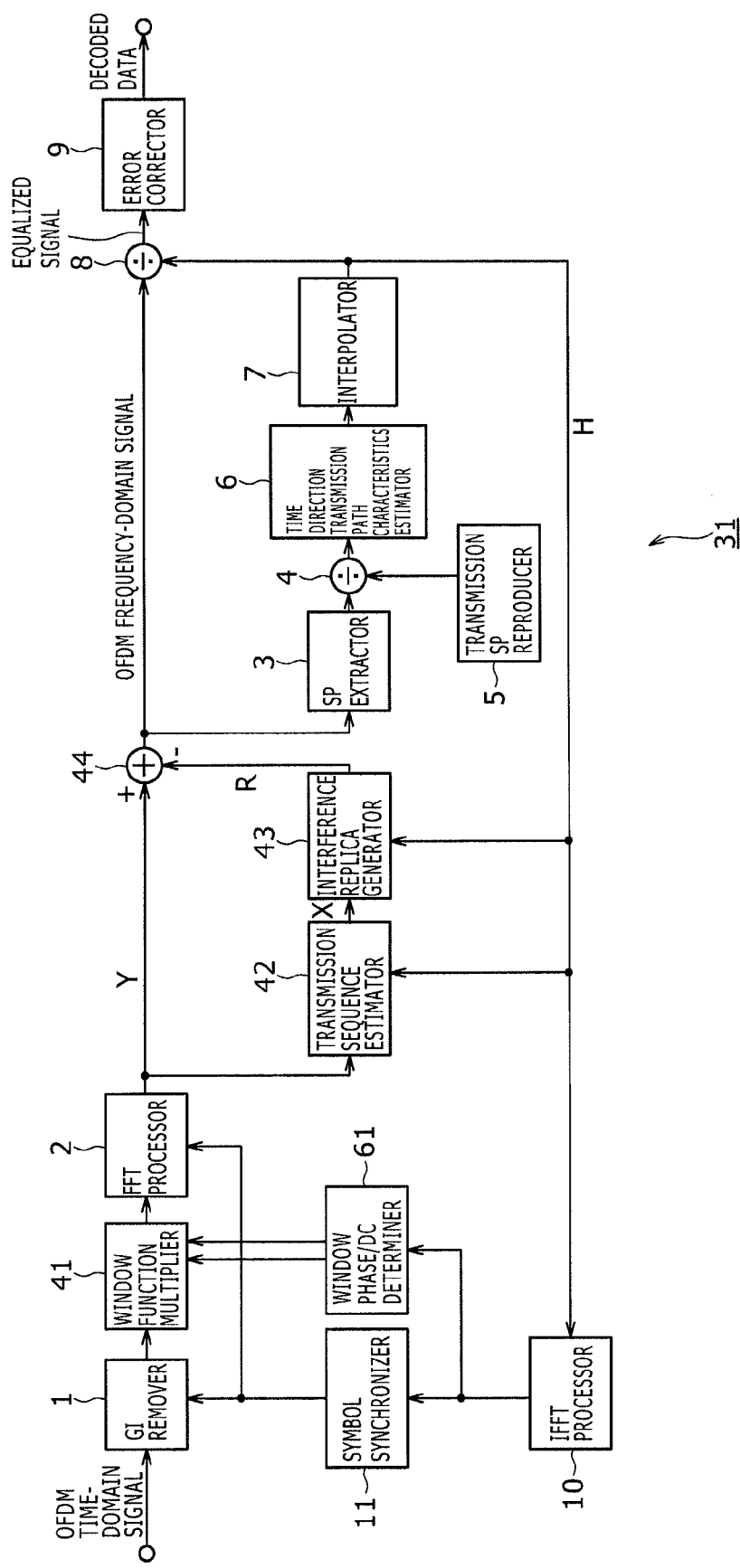
FIG. 15 is a block diagram of a configurational example of an OFDM receiver according to another embodiment of the present invention.

FIG. 15 shows in block form a configurational example of an OFDM receiver 31 according to another embodiment of the present invention.

Those parts of the OFDM receiver 31 shown in FIG. 15 which are identical to those shown in FIG. 8 are denoted by identical reference numerals, and will not be described in detail blow. The OFDM receiver 31 shown in FIG. 15 is different from the OFDM receiver 31 shown in FIG. 8 in that it additionally includes a window phase/DC determiner 61.

The window phase/DC determiner 61 estimates a delay spread from the impulse response of the transmission path which is represented by the signal supplied from the IFFT processor 10. The window phase/DC determiner 61 also adaptively moves the window function used by the window function multiplier 41 in a phase direction and a DC direction depending on the delay spread. The window function multiplier 41 removes the interferential component from the OFDM time-domain signal using the window function that is shifted in the phase direction and the DC direction.

Figure 16:
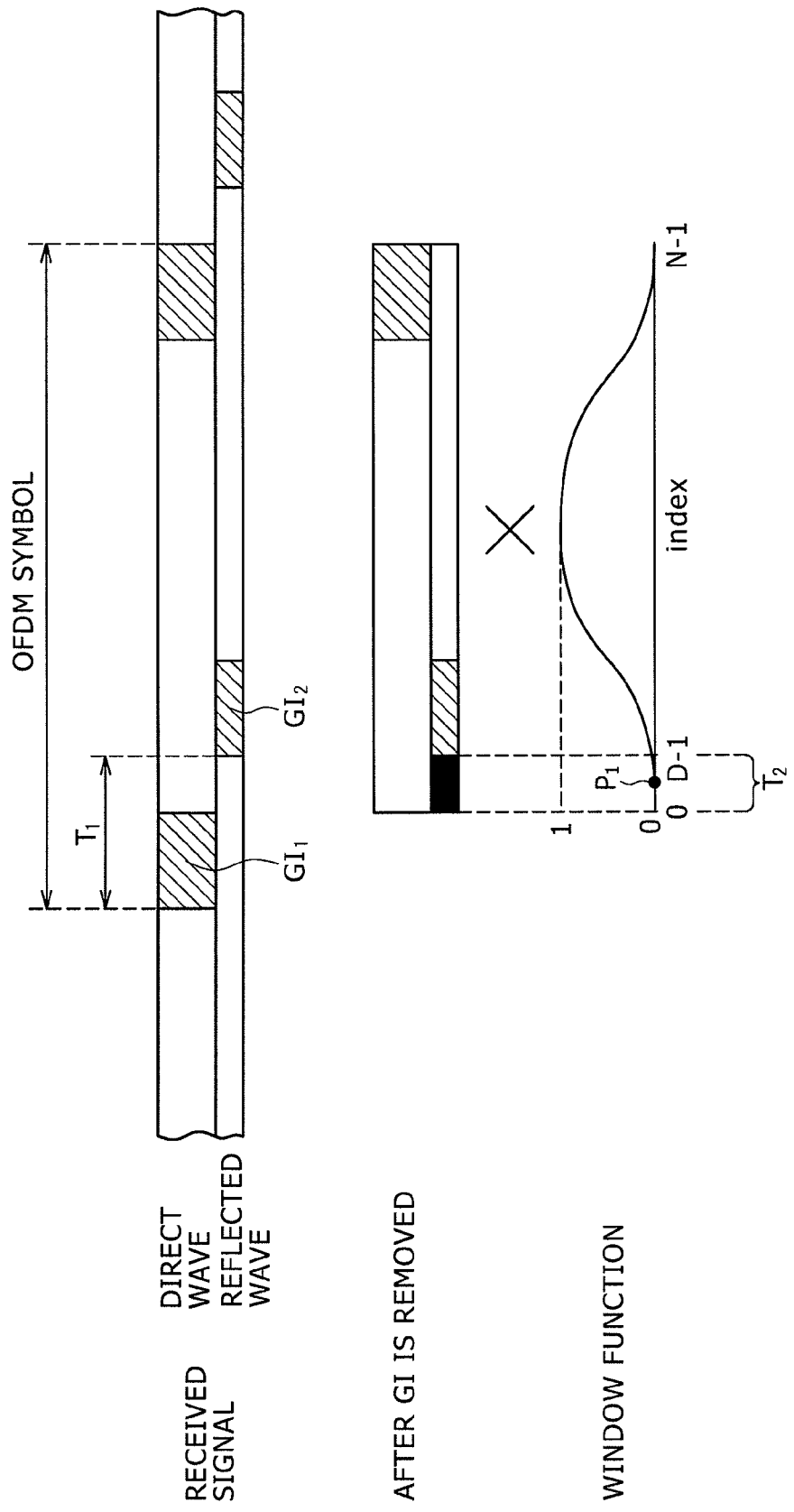
FIG. 16 is a diagram showing the movement of a window function by way of example.

FIG. 16 shows the movement of the window function by way of example.

A received signal which is shown in an upper portion of FIG. 16 is the same as the received signal described with reference to FIG. 9. When such a signal is received, the window phase/DC determiner 61 estimates that a delay spread occurs for a time corresponding to the zone T1, from the impulse response of the transmission path determined by the IFFT processor 10.

The window phase/DC determiner 61 is given the same window function as the window function described with reference to FIG. 9. The window phase/DC determiner 61 moves the window function in the phase direction (horizontal direction) and the DC direction (vertical direction) depending on the delay spread.

With respect to the phase, for example, the window phase/DC determiner 61 subtracts the GI length from the delay spread, and shifts the window function for a time which is one-half of the remaining time.

FIG. 16 shows the waveform of the window function shifted in the phase direction in a lower portion thereof. According to the shifted window function, a position $P_1$ where the window function takes a value of 0 is shifted to the right for a time which is one-half of the zone $T_2$ which represents the remaining time produced by subtracting the GI length from the zone $T_1$ representative of the delay spread.

With respect to the DC component, the window phase/DC determiner 61 determines a value α with which a value $DC_{opt}$ expressed by the equation (6) shown below is minimum, subtract the amplitude value of the window function by the determined value α, and shifts the window function downwardly as a whole.

$$DC_{opt} = \min_{\alpha} \left\{ \sum_{k=0}^{D-1} |w[k] - \alpha|^2 \right\} \quad (6)$$

where w[k] represents the window function shifted in phase.

Figure 17:
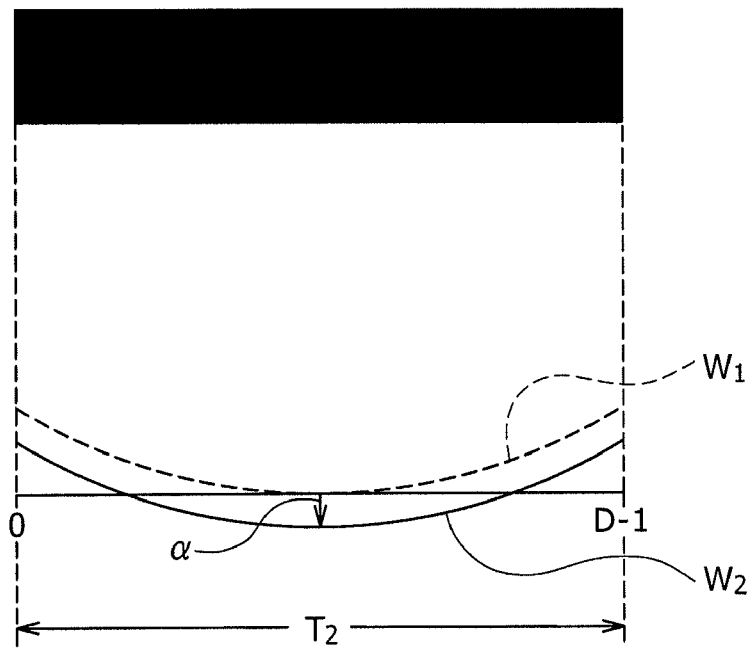
FIG. 17 is an enlarged diagram of a portion in zone $T_2$ shown in FIG. 16.

FIG. 17 is an enlarged diagram of a portion of the window function and a portion of the OFDM time-domain signal from which the GI is removed, which are included in the zone $T_2$ shown in FIG. 16.

A dotted-line curve $W_1$ shown in FIG. 17 represents a window function whose position is shifted in the phase direction, and a solid-line curve $W_2$ a window function whose position is shifted in the DC direction as well as the phase direction.

As described above, a residual ISI power level which is not removed even when the OFDM time-domain signal is multiplied by the window function is indicated by the area of a portion of the band which overlaps the window function when the band shown solid and the window function overlap each other.

Figure 18A:
FIGS. 18A and 18B are diagrams showing residual ISI power levels.

Therefore, a residual ISI power level at the time the OFDM time-domain signal is multiplied by the window function $W_1$ positionally shifted in the phase direction is indicated by the area of a portion shown hatched in FIG. 18A. In addition, a residual ISI power level at the time the OFDM time-domain signal is multiplied by the window function $W_2$ positionally shifted in the DC direction as well as the phase direction is indicated by the area of a portion shown hatched in FIG. 18B.

Figure 18B:
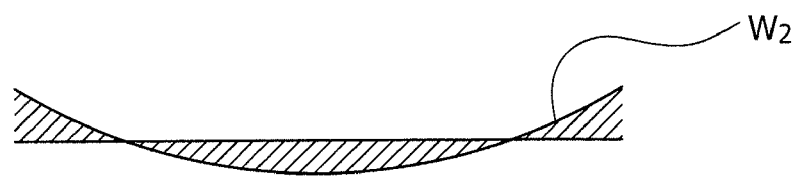

The area of the portion shown hatched in FIG. 18B is smaller than the area of the portion shown hatched in FIG. 18A. Consequently, the residual ISI power level can be made smaller when the window function is positionally shifted also in the DC direction than when the window function is positionally shifted only in the phase direction.

Thus, it is possible to increase the ability to reduce the ISI by shifting the window function depending on the delay spread. The window function may be moved in at least either one of the phase direction and the DC direction.

The above processing sequences may be implemented by hardware or software. If the processing sequences are implemented by software, software programs representing the processing sequences are installed from a program recording medium into a computer assembled as dedicated hardware or a general-purpose computer which can perform various functions by installing various programs.

Figure 19:
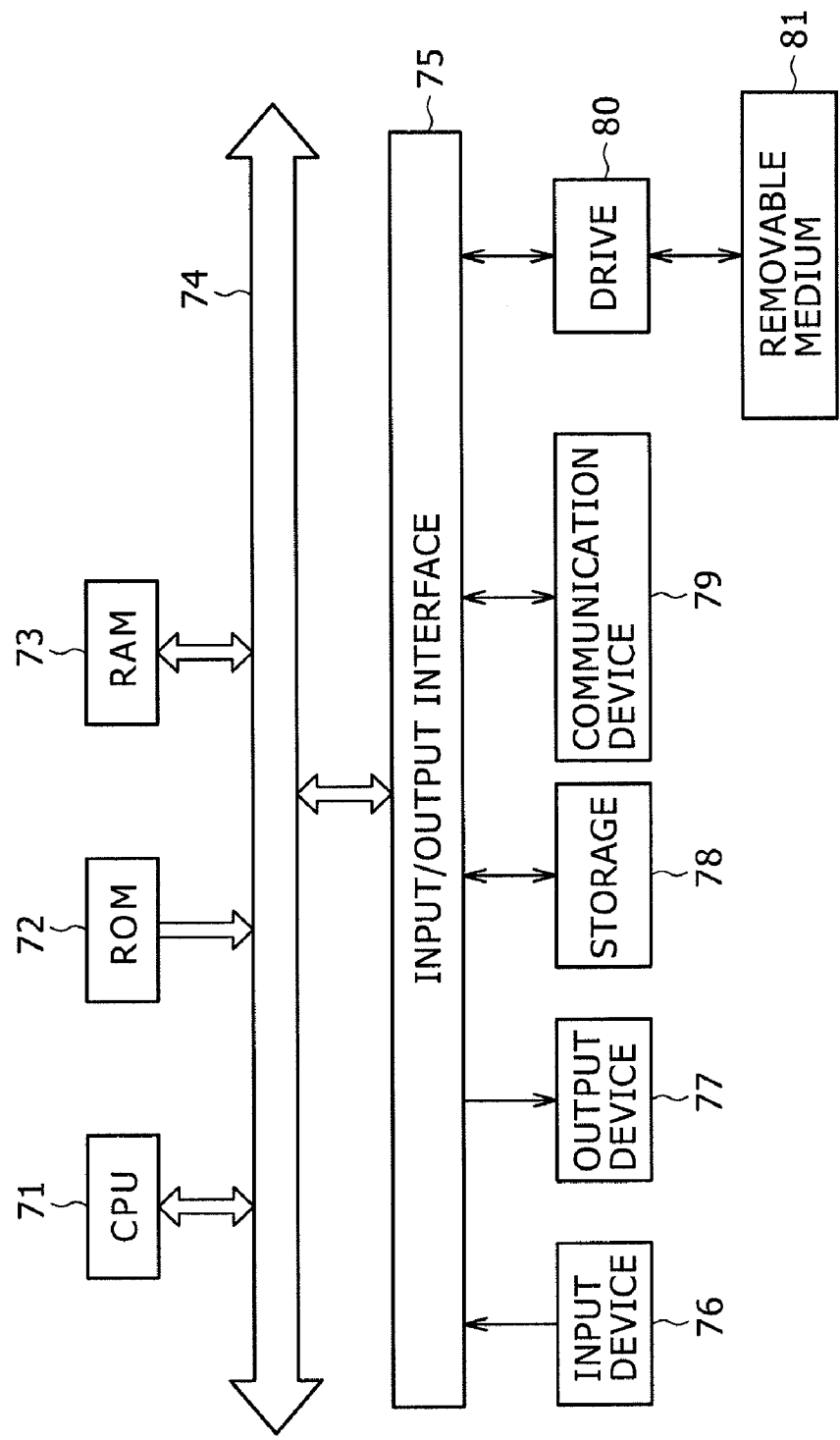
FIG. 19 is a block diagram showing a configurational example of a computer hardware system.

FIG. 19 shows in block form a configurational example of a computer hardware system for carrying out the above processing sequences according to programs.

As shown in FIG. 19, the computer hardware system includes a CPU (Central Processing Unit) 71, a ROM (Read Only Memory) 72, and a RAM (Random Access Memory) 73 which are connected to each other by a bus 74.

An input/output interface 75 is connected to the bus 74. To the input/output interface 75, there are connected an input device 76 including a keyboard, a mouse, a microphone, etc., an output device 77 including a display, a speaker, etc., a storage 78 including a hard disk, a nonvolatile memory, etc., a communication device 79 including a network interface, etc., and a drive 80 for driving a removable medium 81 such as an optical disk, a semiconductor memory, or the like.

The computer hardware system operates as follows: The CPU 71 loads programs stored in the storage 78, for example, through the input/output interface 75 and the bus 74 into the RAM 73, and then executes the loaded programs to perform the above processing sequences.

The programs executed by the CPU 71 may be recorded in the removable medium 81 or may be downloaded through a wired or wireless transmission medium such as a local area network, the Internet, digital broadcasts, or the like, and installed in the storage 78.

The programs executed by the CPU 71 may be programs for performing the processing sequences in the order described above or may be programs for performing the processing sequences concurrently or at required timings such as when called.

Although certain preferred embodiments of the present invention have been shown and described in detail, it should be understood that various changes and modifications may be made therein without departing from the scope of the appended claims.

The present application contains subject matter related to that disclosed in Japanese Priority Patent Application JP 2008-065545 filed in the Japan Patent Office on Mar. 14, 2008, the entire content of which is hereby incorporated by reference.

What is claimed is:

1. A demodulating circuit comprising:

Fast Fourier Transform (FFT) processing means for performing an FFT process on an Orthogonal Frequency Division Multiplexing (OFDM time-domain signal;

intercarrier interferential component removing means for removing an intercarrier interferential component from an OFDM frequency-domain signal which is produced when the FFT process is performed on the OFDM time-domain signal by said FFT processing means;

extracting means for extracting pilot signals representative of transmission path characteristics of a transmission path from said OFDM frequency-domain signal from which the intercarrier interferential component is removed by said intercarrier interferential component removing means;

transmission path characteristics estimating means for estimating transmission path characteristics represented by subsequently received pilot signals, based on the transmission path characteristics represented by said pilot signals extracted by said extracting means;

interpolating means for interpolating transmission path characteristics in a frequency direction based on the transmission path characteristics estimated by said transmission path characteristics estimating means thereby to estimate transmission path characteristics for all subcarriers;

symbol sequence estimating means for estimating a symbol sequence represented by said OFDM frequency-domain signal which is produced when the FFT process is performed on the OFDM time-domain signal by said FFT processing means, based on the transmission path characteristics for all subcarriers which are estimated by said interpolating means; and interference replica generating means for generating an interference replica representing said intercarrier interferential component to be removed from said OFDM frequency-domain signal by said intercarrier interferential component removing means, based on the symbol sequence estimated by said symbol sequence estimating means and the transmission path characteristics for all subcarriers which are estimated by said interpolating means.

2. The demodulating circuit according to claim 1, further comprising:
multiplying means for multiplying the OFDM time-domain signal on which the FFT process is to be performed by said FFT processing means by a window function;
processing means for determining an impulse response of said transmission path using all or part of the transmission path characteristics estimated for all the subcarriers after the FFT process; and
window function determining means for moving said window function to be used by said multiplying means in at least either one of a phase direction and a DC direction depending on a delay spread which is estimated from the impulse response of the transmission path which is determined by said processing means.

3. The demodulating circuit according to claim 1, further comprising:
decimating means for decimating ones of said pilot signals extracted by said extracting means;
wherein said transmission path characteristics estimating means estimates the transmission path characteristics represented by the subsequently received pilot signals, based on transmission path characteristics represented by ones, not decimated by said decimating means, of said pilot signals extracted by said extracting means.

4. A demodulating method comprising the steps of:
performing Fast Fourier Transform (FFT) process on an Orthogonal Frequency Division Multiplexing (OFDM) time-domain signal;
removing an intercarrier interferential component from an OFDM frequency-domain signal which is produced when the FFT process is performed on the OFDM time-domain signal;
extracting pilot signals representative of transmission path characteristics of a transmission path from said OFDM frequency-domain signal from which the intercarrier interferential component is removed;
estimating transmission path characteristics represented by subsequently received pilot signals, based on the transmission path characteristics represented by the extracted pilot signals;
interpolating transmission path characteristics in a frequency direction based on the estimated transmission path characteristics thereby to estimate transmission path characteristics for all subcarriers;
estimating a symbol sequence represented by said OFDM frequency-domain signal which is produced when the FFT process is performed on the OFDM time-domain signal, based on the estimated transmission path characteristics for all subcarriers; and
generating an interference replica representing said intercarrier interferential component to be removed from said OFDM frequency-domain signal, based on the estimated symbol sequence and the estimated transmission path characteristics for all subcarriers.

5. A non-transitory computer-readable storage medium on which is recorded a program for enabling a computer to perform a process including the steps of:
performing a Fast Fourier Transform (FFT) process on an Orthogonal Frequency Division Multiplexing (OFDM) time-domain signal;
removing an intercarrier interferential component from an OFDM frequency-domain signal which is produced when the FFT process is performed on the OFDM time-domain signal;
extracting pilot signals representative of transmission path characteristics of a transmission path from said OFDM frequency-domain signal from which the intercarrier interferential component is removed;
estimating transmission path characteristics represented by subsequently received pilot signals, based on the transmission path characteristics represented by the extracted pilot signals;
interpolating transmission path characteristics in a frequency direction based on the estimated transmission path characteristics thereby to estimate transmission path characteristics for all subcarriers;
estimating a symbol sequence represented by said OFDM frequency-domain signal which is produced when the FFT process is performed on the OFDM time-domain signal, based on the estimated transmission path characteristics for all subcarriers; and
generating an interference replica representing said intercarrier interferential component to be removed from said OFDM frequency-domain signal, based on the estimated symbol sequence and the estimated transmission path characteristics for all subcarriers.

6. A receiving device comprising:
Fast Fourier Transform (FFT) processing means for performing an FFT process on an Orthogonal Frequency Division Multiplexing (OFDM) time-domain signal;
intercarrier interferential component removing means for removing an intercarrier interferential component from an OFDM frequency-domain signal which is produced when the FFT process is performed on the OFDM time-domain signal by said FFT processing means;
extracting means for extracting pilot signals representative of transmission path characteristics of a transmission path from said OFDM frequency-domain signal from which the intercarrier interferential component is removed by said intercarrier interferential component removing means;
transmission path characteristics estimating means for estimating transmission path characteristics represented by subsequently received pilot signals, based on the transmission path characteristics represented by said pilot signals extracted by said extracting means;
interpolating means for interpolating transmission path characteristics in a frequency direction based on the transmission path characteristics estimated by said transmission path characteristics estimating means thereby to estimate transmission path characteristics for all subcarriers;
symbol sequence estimating means for estimating a symbol sequence represented by said OFDM frequency-domain signal which is produced when the FFT process is performed on the OFDM time-domain signal by said FFT processing means, based on the transmission path characteristics for all subcarriers which are estimated by said interpolating means; and
interference replica generating means for generating an interference replica representing said intercarrier interferential component to be removed from said OFDM frequency-domain signal by said intercarrier interferential component removing means, based on the symbol sequence estimated by said symbol sequence estimating means and the transmission path characteristics for all subcarriers which are estimated by said interpolating means.

7. A demodulating circuit comprising:

Fast Fourier Transform (FFT) processing section configured to perform an FFT process on an Orthogonal Frequency Division Multiplexing (OFDM) time-domain signal;

an intercarrier interferential component removing section configured to remove an intercarrier interferential component from an OFDM frequency-domain signal which is produced when the FFT process is performed on the OFDM time-domain signal by said FFT processing section;

an extracting section configured to extract pilot signals representative of transmission path characteristics of a transmission path from said OFDM frequency-domain signal from which the intercarrier interferential component is removed by said intercarrier interferential component removing section;

a transmission path characteristics estimating section configured to estimate transmission path characteristics represented by subsequently received pilot signals, based on the transmission path characteristics represented by said pilot signals extracted by said extracting section;

an interpolating section configured to interpolate transmission path characteristics in a frequency direction based on the transmission path characteristics estimated by said transmission path characteristics estimating section thereby to estimate transmission path characteristics for all subcarriers;

a symbol sequence estimating section configured to estimate a symbol sequence represented by said OFDM frequency-domain signal which is produced when the FFT process is performed on the OFDM time-domain signal by said FFT processing section, based on the transmission path characteristics for all subcarriers which are estimated by said interpolating section; and an interference replica generating section configured to generate an interference replica representing said intercarrier interferential component to be removed from said OFDM frequency-domain signal by said intercarrier interferential component removing section, based on the symbol sequence estimated by said symbol sequence estimating section and the transmission path characteristics for all subcarriers which are estimated by said interpolating section.

8. A receiving device comprising:

a Fast Fourier Transform (FFT) processing section configured to perform an FFT process on an orthogonal Frequency Division Multiplexing (OFDM) time-domain signal;

an intercarrier interferential component removing section configured to remove an intercarrier interferential component from an OFDM frequency-domain signal which is produced when the FFT process is performed on the OFDM time-domain signal by said FFT processing section;

an extracting section configured to extract pilot signals representative of transmission path characteristics of a transmission path from said OFDM frequency-domain signal from which the intercarrier interferential component is removed by said intercarrier interferential component removing section;

a transmission path characteristics estimating section configured to estimate transmission path characteristics represented by subsequently received pilot signals, based on the transmission path characteristics represented by said pilot signals extracted by said extracting section;

an interpolating section configured to interpolate transmission path characteristics in a frequency direction based on the transmission path characteristics estimated by said transmission path characteristics estimating section thereby to estimate transmission path characteristics for all subcarriers;

a symbol sequence estimating section configured to estimate a symbol sequence represented by said OFDM frequency-domain signal which is produced when the FFT process is performed on the OFDM time-domain signal by said FFT processing section, based on the transmission path characteristics for all subcarriers which are estimated by said interpolating section; and an interference replica generating section configured to generate an interference replica representing said intercarrier interferential component to be removed from said OFDM frequency-domain signal by said intercarrier interferential component removing section, based on the symbol sequence estimated by said symbol sequence estimating section and the transmission path characteristics for all subcarriers which are estimated by said interpolating section.

\* \* \* \* \*